United States Patent
Shi et al.

(10) Patent No.: US 12,132,556 B2
(45) Date of Patent: Oct. 29, 2024

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Zhihua Shi, Dongguan (CN); Xin You, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 219 days.

(21) Appl. No.: 17/563,561

(22) Filed: Dec. 28, 2021

(65) Prior Publication Data

US 2022/0123822 A1  Apr. 21, 2022

Related U.S. Application Data

(63) Continuation of application No. PCT/CN2019/100887, filed on Aug. 15, 2019.

(51) Int. Cl.
| | |
|---|---|
| *H04W 72/1263* | (2023.01) |
| *H04B 7/08* | (2006.01) |
| *H04W 52/36* | (2009.01) |
| *H04W 72/21* | (2023.01) |
| *H04W 72/566* | (2023.01) |
| *H04W 76/19* | (2018.01) |

(52) U.S. Cl.
CPC .......... *H04B 7/088* (2013.01); *H04W 52/365* (2013.01); *H04W 72/1263* (2013.01); *H04W 72/21* (2023.01); *H04W 72/566* (2023.01); *H04W 76/19* (2018.02)

(58) Field of Classification Search
None
See application file for complete search history.

(56) References Cited

U.S. PATENT DOCUMENTS

| | | | |
|---|---|---|---|
| 2019/0190582 A1 | 6/2019 | Guo et al. | |
| 2020/0145280 A1* | 5/2020 | Cirik | H04L 41/0668 |

(Continued)

FOREIGN PATENT DOCUMENTS

| | | |
|---|---|---|
| CN | 109803286 A | 5/2019 |
| CN | 109962756 A | 7/2019 |

(Continued)

OTHER PUBLICATIONS

First Office Action issued in corresponding Chinese Application No. 202210082270.6, mailed Mar. 11, 2023.

(Continued)

*Primary Examiner* — Kodzovi Acolatse
(74) *Attorney, Agent, or Firm* — BAYES PLLC

(57) ABSTRACT

Provided is a wireless communication method, a terminal device and a network device. The method includes in response to a beam failure occurred in a secondary cell, a terminal device generating a request message; the request message corresponds to a first configuration or a second configuration, the first configuration being a configuration of a scheduling request associated with at least one logical channel, and the second configuration being a configuration of a scheduling request not associated with a logical channel.

9 Claims, 4 Drawing Sheets

(56) References Cited

U.S. PATENT DOCUMENTS

| | | | | |
|---|---|---|---|---|
| 2022/0124777 | A1* | 4/2022 | Kang | H04W 72/21 |
| 2023/0353223 | A1* | 11/2023 | Jia | H04W 24/04 |

FOREIGN PATENT DOCUMENTS

| | | | |
|---|---|---|---|
| CN | 110022613 A | 7/2019 | |
| CN | 110035556 A | 7/2019 | |
| EP | 3567776 A1 | 11/2019 | |
| EP | 3648369 A1 | 5/2020 | |
| EP | 3735019 A1 | 11/2020 | |
| EP | 3975644 A1 | 3/2022 | |
| JP | 2019532590 A | 11/2019 | |
| JP | 2022529051 A | 6/2022 | |
| KR | 20190029535 A | 3/2019 | |
| KR | 20190033015 A | 3/2019 | |
| KR | 20190085416 A | 7/2019 | |
| KR | 20190085760 A | 7/2019 | |
| RU | 2682011 C1 | 3/2019 | |
| WO | 2019029667 A1 | 2/2019 | |
| WO | 2019032882 A1 | 2/2019 | |
| WO | 2019130523 A1 | 7/2019 | |
| WO | 2020215286 A1 | 10/2020 | |

OTHER PUBLICATIONS

Notice of Allowance issued in corresponding Russian Application No. 2022104052, mailed Apr. 3, 2023.
Notice of Allowance issued in corresponding Chinese Application No. 202210082270.6, mailed Jun. 1, 2023.
First Office Action issued in corresponding Japanese application No. 2022-503954, mailed Jul. 7, 2023.
First Office Action issued in corresponding Korean application No. 10-2022-7002526, mailed Jul. 10, 2023.
Second Office Action issued in corresponding European application No. 19941700.7, mailed Jul. 20, 2023.
3GPP TSG-RAN WG2 #107; Tdoc R2-1910357; Prague, Czech Republic, Aug. 26-30, 2019 Source: Ericsson; Title: BFR on SCell.
Extended European Search Report issued in corresponding European Application No. 19941700.7, mailed May 9, 2022, 11 pages.
First Office Action issued in corresponding Indian Application No. 202217007818, mailed Jul. 5, 2022, 6 pages.
"Enhancements on Multi-beam Operation", R1-1905027, Source: Qualcomm Incorporated, 3GPP TSG-RAN WG1 Meeting #96-Bis Xi'an, China, Apr. 8-12, 2019, 26 pages.
"Enhancements on multi-beam operations", R1-1906537, Source: MediaTek Inc., 3GPP TSG RAN WG1 #97 Reno, USA, May 13-17, 2019, 13 pages.
First Office Action issued in corresponding European Application No. 19941700.7, mailed Feb. 6, 2023.
First Office Action issued in corresponding Russian Application No. 2022104052, mailed Dec. 13, 2022.
International Search Report issued in corresponding International Application No. PCT/CN2019/100887, mailed May 14, 2020, 52 pages.
Written Opinion of the International Searching Authority issued in corresponding International Application No. PCT/CN2019/100887, mailed May 14, 2020, 7 pages.
"Summary on SCell BFR and L1-SINR", Agenda item: 7.2.8.3, Source: Intel Corporation, 3GPP TSG RAN WG1 Meeting #96 R1-1903461, Athens, Greece, Feb. 25-Mar. 1, 2019, 19 pages.
"Summary 3 on SCell BFR and L1-SINR", Agenda item: 7.2.8.3, Source: Intel Corporation, 3GPP TSG RAN WG1 Meeting #96b R1-1905844, Xi'an, China, Apr. 8-12, 2019, 23 pages.
Notice of Allowance issued in corresponding Japanese application No. 2022-503954, mailed Dec. 15, 2023.
Notice of Allowance issued in corresponding European application No. 19941700.7, mailed Jan. 22, 2024.
Notice of Allowance issued in corresponding Korean application No. 10-2022-7002526, mailed Jan. 25, 2024.
Extended European search report issued in corresponding European application No. 24178533.6, mailed Aug. 26, 2024.
Source: Samsung; Title: Contention Based BFR Procedure: Reporting Candidate Beam 3GPP TSG-RAN2 102 R2-1806824 Busan, South Korea, May 21-May 25, 2018.
Source: Sharp; Title: Remaining issues on beam failure recovery 3GPP TSG RAN WG2 Meeting #101bis R2-1805864 Sanya, China, Apr. 16-20, 2018.

* cited by examiner

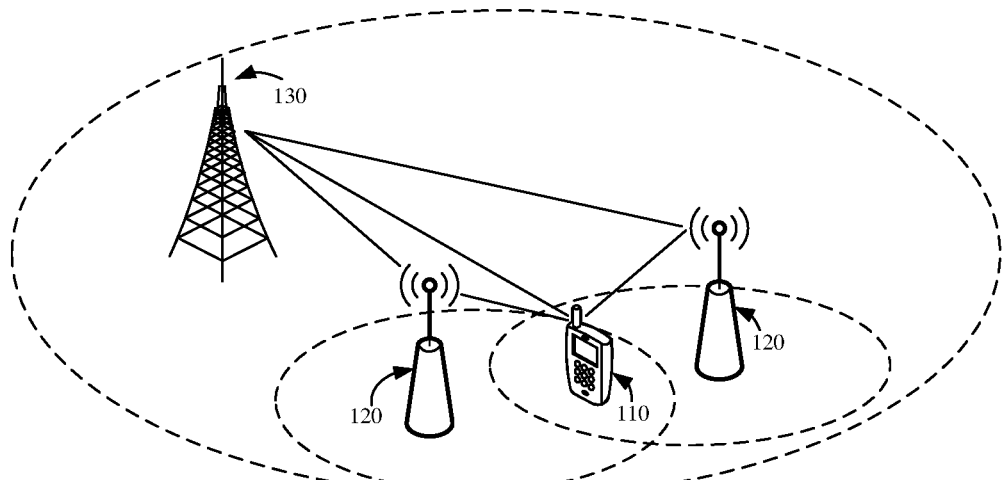
FIG. 1
In response to a beam failure occurred in a secondary cell, generating, by a terminal device, a request message — 210
FIG. 2
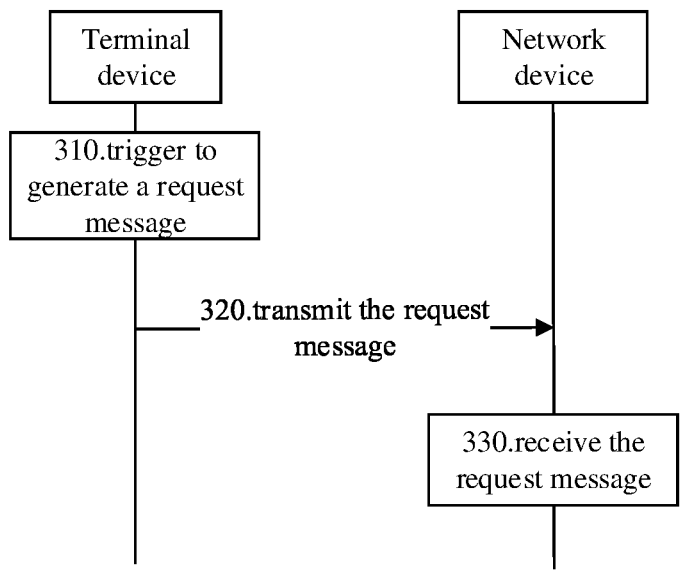
FIG. 3

WIRELESS COMMUNICATION METHOD, TERMINAL DEVICE, AND NETWORK DEVICE

CROSS-REFERENCE TO RELATED APPLICATIONS

This application is a continuation of International Application No. PCT/CN2019/100887 filed on Aug. 15, 2019, entitled "Wireless communication method, Terminal device, and Network device," the contents of which are incorporated herein by reference in its entirety.

TECHNICAL FIELD

Embodiments of the present disclosure relate to the field of communication technologies, and more particularly, to a wireless communication method, a terminal device, and a network device.

BACKGROUND

In the communication standard, a beam failure recovery (BFR) procedure of a secondary cell (SCell) has not yet been defined.

SUMMARY

Embodiments of the present disclosure provide a wireless communication method, a terminal device, and a network device.

In a first aspect, there is provided a wireless communication method, including: in response to a beam failure occurred in a secondary cell, generating, by a terminal device, a request message; wherein the request message corresponds to a first configuration or a second configuration, the first configuration is a configuration of a scheduling request associated with at least one logical channel, and the second configuration is a configuration of a scheduling request not associated with a logical channel.

In a second aspect, there is provided a terminal device, including: a processing module, configured to generate a request message in response to a beam failure occurred in a secondary cell, and the request message corresponds to a first configuration or a second configuration, the first configuration is a configuration of a scheduling request associated with at least one logical channel, and the second configuration is a configuration of a scheduling request not associated with a logical channel.

In a third aspect, there is provided a terminal device, including: a communication module, configured to receive configuration information, and the configuration information is used to configure a PUCCH resource; and the communication module is further configured to: in response to a beam failure occurred in a secondary cell, transmit a reporting message through the PUCCH resource and/or transmit a MAC CE through a PUSCH resource.

BRIEF DESCRIPTION OF THE DRAWINGS

FIG. 1 is a schematic diagram of an application scenario provided by embodiments of the present disclosure;

FIG. 2 is a schematic diagram of a wireless communication method provided by an embodiment of the present disclosure;

FIG. 3 is a schematic diagram of a wireless communication method provided by another embodiment of the present disclosure;

DETAILED DESCRIPTION

Figure 4:
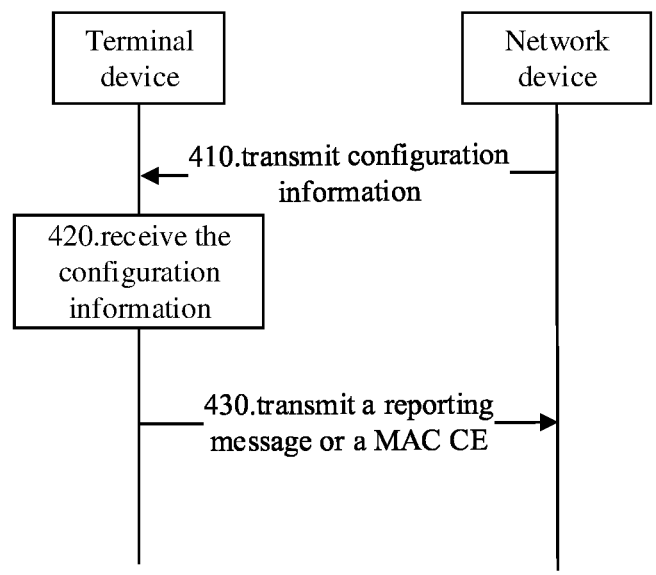
FIG. 4 is a schematic diagram of a wireless communication method provided by another embodiment of the present disclosure.

The technical solutions in the embodiments of the present disclosure will be described below with reference to the accompanying drawings in the embodiments of the present disclosure. Apparently, the described embodiments are part of the embodiments of the present disclosure, but not all of the embodiments. Based on the embodiments in the present disclosure, all other embodiments obtained by a person of ordinary skill in the art without creative efforts shall fall within the protection scope of the present disclosure.

The technical solutions according to the embodiments of the present disclosure may be applied to a variety of communications systems, such as a Global System for Mobile communications ("GSM" for short) system, a Code Division Multiple Access ("CDMA" for short) system, a Wideband Code Division Multiple Access ("WCDMA" for short) system, a General Packet Radio Service ("GPRS" for short), a Long Term Evolution ("LTE" for short) system, an LTE Frequency Division Duplex ("FDD" for short) system, an LTE Time Division Duplex ("TDD" for short), a Universal Mobile Telecommunication System ("UMTS" for short), a Worldwide Interoperability for Microwave Access ("WiMAX" for short) communications system, a 5G system, or the like.

As shown in FIG. 1, a terminal device 110 is connected to a first network device 130 in a first communication system and a second network device 120 in a second communication system. For example, the first network device 130 is a network device in a Long Term Evolution (LTE), and the second network device 120 is a network device in a New Radio (NR).

There are multiple cells under the first network device 130 and the second network device 120.

It should be understood that FIG. 1 is an example of a communication system according to an embodiment of the present disclosure, and the embodiment of the present disclosure is not limited to that shown in FIG. 1.

As an example, the communication system to which the embodiment of the present disclosure is adapted may include at least multiple network devices under the first communication system and/or multiple network devices under the second communication system.

For example, the system 100 shown in FIG. 1 may include a primary network device under the first communication system and at least one secondary network device under the second communication system. At least one secondary network device is respectively connected to the primary network device to form multiple connections, and is respectively connected to the terminal device 110 to provide services for the terminal device. Specifically, the terminal device 110 may simultaneously establish connections through the primary network device and the secondary network device.

Optionally, a connection established between the terminal device 110 and the primary network device is a primary connection, and a connection established between the terminal device 110 and the secondary network device is a secondary connection. A control signaling of the terminal device 110 may be transmitted through the primary connection, while data of the terminal device 110 may be transmitted through the primary connection and the secondary connection simultaneously, or may be transmitted only through the secondary connection.

As another example, the first communication system and the second communication system in the embodiments of the present disclosure are different, but the specific type of the first communication system and the second communication system is not limited.

For example, the first communication system and the second communication system may be various communication systems, such as: a GSM system, a CDMA system, a WCDMA system, a GPRS system, a LTE system, a TDD system, and an UMTS, etc.

The primary network device and the secondary network device may be any access network device.

Optionally, in some embodiments, the access network device may be a base station (Base Transceiver station, BTS) in the GSM system or the CDMA system, or a NodeB (NB) in the WCDMA system, or an Evolutional Node B (eNB or eNodeB) in the LTE system.

According to some implementations, the access network device may also be a next generation radio access network (NG RAN), a base station (gNB) in an NR system, or a wireless controller in a cloud radio access network (CRAN). Or, the access network device can be a relay station, an access point, an in-vehicle device, a wearable device, or a network device in a future-evolutional public land mobile network (PLMN), etc.

In the system 100 shown in FIG. 1, an implementation where the first network device 130 is served as the primary network device and the second network device 120 is served as the secondary network device is taken as an example.

The first network device 130 may be an LTE network device, and the second network device 120 may be an NR network device. Or, the first network device 130 may be an NR network device, and the second network device 120 may be an LTE network device. Or, both the first network device 130 and the second network device 120 may be an NR network device. Or, the first network device 130 may be a GSM network device, a CDMA network device, etc., and the second network device 120 may also be a GSM network device, a CDMA network device, etc. Or, the first network device 130 may be a Macrocell, and the second network device 120 may be a Microcell, Picocell, Femtocell, or the like.

According to some implementations, the terminal device 110 may be any terminal device, and the terminal device 110 includes but is not limited to:

an apparatus that is configured to receive or transmit communication signals via wired line connections, such as via Public Switched Telephone Networks (PSTN), Digital Subscriber Lines (DSL), digital cables, direct cable connections and/or another data connections/networks; and/or via wireless interfaces, such as wireless interfaces configured for cellular networks, wireless local area networks (WLAN), like digital TV network of DVB-H networks, satellite networks, AM-FM broadcast transmitters and/or another terminal and/or Internet of Things (IoT) device. A terminal device set to communicate via a wireless interface may be referred to as a "wireless communication terminal", a "wireless terminal" or a "mobile terminal". Examples of mobile terminals include but are not limited to satellites or cellular phones; Personal Communications System (PCS) terminals that can combine cellular radio phones with data processing, fax, and data communication capabilities; PDA that includes radio phones, pagers, Internet/intranet access, Web browser, memo pad, calendar, and/or Global Positioning System (GPS) receiver; and conventional laptop and/or palmtop receivers or other electronic apparatuses including radio telephone transceivers. The terminal may refer to access terminals, user equipment (UE), user units, user stations, mobile stations, mobile platforms, remote stations, remote terminals, mobile device, user terminals, terminals, wireless communication device, user agents or user apparatuses. The access terminal may be cellular phones, cordless phones, Session Initiation Protocol (SIP) phones, Wireless Local Loop (WLL) stations, personal digital assistants (PDA), handheld devices with wireless communication functions, computing devices or other processing devices connected to wireless modems, in-vehicle devices, wearable devices, terminals in 5G networks, or terminals in the future enhanced PLMN, etc.

It should be understood that the terms "system" and "network" herein may often be interchanged herein. The term "and/or" herein is only an association relationship that describes associated objects, and represents that there may be three relationships. For example, A and/or B may represent that: A exists alone, A and B exist simultaneously, and B exists alone. In addition, the character "/" herein generally indicates that former and latter associated objects are in an "or" relationship.

In a system, a beam is embodied through its corresponding reference signal resource, such as by measuring a channel state information reference signal (CSI-RS) resource and/or a synchronization signal/physical broadcast channel block (SS/PBCH Block). Therefore, in the previous and subsequent descriptions, in order to express conciseness, the word beam is often used directly, but it actually refers to its corresponding CSI-RS resource and/or SS/PBCH Block.

In the embodiments of the present disclosure, a corresponding BFR procedure can be designed according to characteristics of the SCell itself. For example, when the link quality of the SCell goes wrong, a primary cell (PCell) or a primary secondary cell (PSCell) corresponding to the terminal device can be used for communication.

In the embodiments of the present disclosure, the BFR procedure may sometimes be referred to as a beam failure request (BFRQ) procedure.

Based on this, for example, a message for requesting a resource can be transmitted, through the PCell or PSCell of the terminal device or other SCells, to the network device, so as to transmit beam failure information of a certain SCell on the resource requested. Alternatively, through the PCell or PSCell of the terminal device or other SCells, a physical uplink control channel (PUCCH) resource configured by the network device is used to transmit a request message or a physical uplink shared channel (PUSCH) resource is used to transmit a media access control (MAC) control element (CE). The MAC CE carries beam failure related information of a certain SCell and/or corresponding new candidate beam information.

In the embodiments of the present disclosure, in a case where a beam failure occurs in a certain SCell, the terminal device may generate a request message, which may be used to request an uplink transmission resource from the network device or notify the network device that the beam failure occurs in the SCell of the terminal device. After receiving the request message transmitted from the terminal device, the network device can allocate a resource to the terminal device, so that the terminal device can transmit the beam failure information of the SCell to the network device on the allocated resource. Further, the transmission of the beam failure information can take precedence over transmission of other data or information, thereby reducing a delay of the BFR procedure.

FIG. 2 is a schematic flowchart of a wireless communication method 200 provided by an embodiment of the present disclosure. The method 200 may be executed by the terminal device in the communication system shown in FIG. 1. As shown in FIG. 2, the method 200 may include step 210.

In step 210, in response to a beam failure occurred in a secondary cell, the terminal device generates a request message.

FIG. 3 is a schematic flowchart of a wireless communication method 300 provided by another embodiment of the present disclosure. As shown in FIG. 3, the method 300 may include steps 310-330.

In step 310, in response to a beam failure occurred in a secondary cell, the terminal device generates a request message.

In step 320, the terminal device transmits the request message to a network device.

In step 330, the network device receives the request message.

The request message corresponds to a first configuration or a second configuration, the first configuration is a configuration of a scheduling request associated with at least one logical channel, and the second configuration is a configuration of a scheduling request not associated with a logical channel.

In the embodiments of the present disclosure, the request message generated by the terminal device may be a request message for BFR, and the request message for BFR is a scheduling request (SR). If a beam failure occurs in the SCell of the terminal device, the terminal device can communicate with the network device based on its SR configuration, and the configuration corresponding to the request message may be the first configuration mentioned above.

The configuration corresponding to the request message may also be a configuration different from the SR configuration, and may be a configuration additionally indicated by the network device to the terminal device, and the configuration may not be associated with any logical channel. If the beam failure occurs in the SCell of the terminal device, the terminal device can communicate with the network device based on the configuration, and the configuration corresponding to the request message can be the second configuration mentioned above.

For the PCell or PSCell, if the beam failure occurs in the PCell or PSCell of the terminal device, the terminal device can select a physical random access channel (PRACH) from contention random access resources to initiate transmission.

Optionally, in some embodiments, the configuration additionally indicated by the network device to the terminal device may also be referred to as the SR configuration. That is to say, although the configuration additionally indicated by the network device to the terminal device may not be associated with the logical channel, some or all of the configuration parameter types may be the same as the SR configuration. Therefore, the configuration can also be referred to as the SR configuration, and the terminal device can still communicate with the network device based on this configuration.

In the wireless communication method provided by the embodiments of the present disclosure, in a case where the beam failure occurs in the SCell, the terminal device can generate the request message according to the first configuration or the second configuration, and can execute the BFR procedure of the secondary cell.

The first configuration is the configuration of the scheduling request associated with at least one logical channel, indicating that a configuration of the request message can reuse the configuration of the scheduling request of the logical channel, which can reduce complexity of communication standards and reduce implementation complexity of the terminal device.

Alternatively, the second configuration is the scheduling request configuration not associated with the logical channel, and thus, a conflict between the configuration of the request message and the configuration of the scheduling request of the logical channel can be avoided, and the processing of the request message and the scheduling request can be simplified.

Optionally, in some embodiments, the request message is used to request an uplink transmission resource from the network device and/or notify the network device that the beam failure occurs in the secondary cell.

In the embodiments of the present disclosure, if the terminal device transmits the request message to the network device, in one implementation, the request message can be used to request an uplink transmission resource from the network device. After receiving the request message, the network device can allocate a resource to the terminal device. The terminal device can transmit beam failure information of the SCell to the network device based on the allocated resource.

In another implementation, the request message may be used to notify the network device that the beam failure occurs in the SCell. After receiving the request message, the network device can allocate a resource to the terminal device based on a predetermined rule, so that the terminal device can transmit the beam failure information of the SCell to the network device based on the allocated resource. The predetermined rule may be a rule agreed upon by the terminal device and the network device in advance, that is, the network device allocates a resource to the terminal device upon receiving the request message informing it of the occurrence of the beam failure. The predetermined rule may also be implemented by the network device itself.

The uplink transmission resource in the embodiments of the present disclosure may be the PUSCH resource. It will be appreciated that, in the case where the beam failure occurs in the SCell of the terminal device, if the terminal device needs to transmit the beam failure information of the SCell to the network device, since the beam failure occurs in the SCell of the terminal device, the terminal device can first transmit a request message to the network device through the PUCCH resource based on the PCell or PSCell or another SCell of the terminal device to request a PUSCH resource from the network device. After receiving the request message, the network device can allocate the PUSCH resource to the terminal device, and the terminal device can transmit the beam failure information of the SCell to the network device through the PUSCH resource. Optionally, the step of transmitting the request message to the network device through the PUCCH resource can be omitted.

The specific beam failure information of the SCell in the embodiments of the present disclosure can be transmitted through the MAC CE. The beam failure information of the SCell can indicate a cell where the beam failure occurs, a beam on which the beam failure occurs, or a new beam. The beam failure information of the SCell can also indicate a beam not meeting a preset condition.

As pointed out above, the configuration of the request message can correspond to the first configuration or the second configuration. The following will respectively introduce the relevant procedures of the BFR in the case of the configuration of the request message corresponding to these two configurations.

Optionally, in the case where the configuration corresponding to the request message is the first configuration, the first configuration may be determined from a configuration set based on at least one of the following: indication information of the network device, a scheduling request identifier corresponding to each configuration in the configuration set, a resource identifier corresponding to each configuration in the configuration set, and a priority order of logical channels corresponding to respective configurations in the configuration set. Alternatively, the first configuration is randomly selected from the configuration set.

The configuration set includes a configuration of at least one scheduling request, and each scheduling request corresponds to the at least one logical channel.

In the embodiments of the present disclosure, the configuration of the request message may be selected from the configuration set. In a process of selecting the first configuration, the selection may be made based on different criteria or rules. For example, the indication information of the network device may indicate a configuration in the configuration set as the configuration of the request message; or the configuration of the request message may also be selected based on the SR identifier (ID) corresponding to each configuration in the configuration set or the SR resource identifier corresponding to each configuration; or the configuration of the request message may also be selected based on the priority order of logical channels corresponding to respective configurations in the configuration set; or the configuration of the request message may also be a configuration randomly selected by the terminal device from the configuration set.

In the embodiments of the present disclosure, the logical channel corresponding to the configuration may refer to a logical channel associated with the scheduling request configuration.

The SR ID or the SR resource ID in the embodiments of the present disclosure may be a sequence, and the terminal device may select the configuration of the request message according to the SR ID or the SR resource ID.

It should be understood that, in the embodiments of the present disclosure, each configuration in the configuration set can be associated with the at least one logical channel, and different logical channels can carry different data. Therefore, the first configuration can be determined according to priorities of different logical channels.

In the embodiments of the present disclosure, each configuration in the configuration set may include a corresponding SR ID, a timer, and the maximum transmission number. For example, the timer may be used to control an interval of transmitting the request message through the PUCCH resource, and the maximum transmission number may be the maximum transmission number of transmitting the request message through the PUCCH resource. The resource configuration corresponding to each configuration in the configuration set may include: which SR is associated with, a time domain period and location, and the PUCCH resource. Which SR is associated with can enable the SR to transmit the message based on the corresponding resource configuration, and the time domain period can be an interval time of using the PUCCH resource. If the corresponding resource configuration in the configuration includes one PUCCH resource, the terminal device can use the PUCCH resource to transmit the request message to the network device.

In the above, it is briefly explained that the network device can determine the first configuration from the configuration set based on different criteria or rules, which will be described in detail below.

Optionally, in some embodiments, the indication information of the network device is indicated by configuration information related to the BFR.

During the BFR, the network device can indicate the configuration of the request message through the BFR configuration information. For example, an information element (IE) (also referred to as a field) in the BFR configuration information can be used to indicate a configuration in the configuration set as the configuration of the request message, that is, the first configuration.

For example, if the configuration set includes 5 SR configurations, namely SR0 configuration, SR1 configuration, SR2 configuration, SR3 configuration, SR4 configuration, the IE in the BFR configuration information can indicate that the configuration corresponding to SR1 is the first configuration, and then the terminal device can generate a corresponding request message based on the SR1 configuration, and/or transmit the request message to the network device through its corresponding PUCCH resource.

It should be understood that the IE in the BFR configuration information indicating that the SR1 configuration is the first configuration is only an example for illustration, and should not pose any limitation on the present disclosure, and the configuration corresponding to other SRs may also be indicated as the first configuration.

Optionally, the first configuration is a configuration in the configuration set that satisfies the following condition: the identifier of a scheduling request corresponding to the configuration is the largest or the smallest, or the identifier of a resource of a scheduling request corresponding to the configuration is the largest or smallest.

In the embodiments of the present disclosure, according to the SR ID corresponding to the SR configuration, the configuration of the request message can be determined from the configuration set, that is, the first configuration. For example, the largest SR ID corresponding to the SR configuration or the smallest SR ID corresponding to the SR configuration may be determined as the first configuration.

For example, if the configuration set includes 5 SR configurations, namely SR0 configuration, SR1 configuration, SR2 configuration, SR3 configuration, and SR4 configuration, the corresponding SR IDs are 0, 1, 2, 3, 4, respectively. The terminal device may transmit the request message to the network device based on the SR4 configuration with the largest SR ID, or transmit the request message to the network device based on the SR0 configuration with the smallest SR ID.

In the embodiments of the present disclosure, a corresponding request message may be generated based on the configuration corresponding to the largest SR ID or the smallest SR ID in the SR configurations, and/or the request message may be sent to the network device. In some cases, the SR ID may also be arbitrarily selected from the configuration set, and the request message is sent to the network device based on a SR configuration corresponding to the arbitrarily selected SR ID.

In some embodiments, the largest resource ID or the smallest resource ID corresponding to the SR configuration may also be determined as the first configuration.

For example, if the configuration set includes 5 SR configurations, namely SR0 configuration, SR1 configuration, SR2 configuration, SR3 configuration, and SR4 configuration, respective resource IDs of SRs corresponding to each SR configuration are 1, 2, 3, 4, and 5 respectively. The terminal device may transmit the request message to the network device based on the configuration corresponding to SR4 which has the largest resource ID among the SRs, or transmit the request message to the network device based on the configuration corresponding to SR0 which has the smallest resource ID among the SRs.

In the embodiments of the present disclosure, a corresponding request message may be generated based on the configuration corresponding to the largest resource ID of the SR or the smallest resource ID of the SR in the SR configuration, and/or the request message may be sent to the network device. In some cases, the resource ID of the SR may also be arbitrarily selected from the configuration set, and the request message is sent to the network device based on the SR configuration corresponding to the arbitrarily selected resource ID of the SR.

Optionally, the first configuration is a configuration in the configuration set that satisfies the following condition: a priority of a logical channel associated with a scheduling request corresponding to the configuration is the highest or the lowest.

In the embodiments of the present disclosure, since the SR configuration in the configuration set can be associated with the at least one logical channel, the first configuration can be determined from the configuration set according to the priority of the logical channel associated with the SR configuration. For example, the SR configuration with the highest priority of the associated logical channel or the SR configuration with the lowest priority of the associated logical channel may be determined as the first configuration.

For example, if the configuration set includes 5 SR configurations, namely SR0 configuration, SR1 configuration, SR2 configuration, SR3 configuration, and SR4 configuration, the logical channels associated with respective SR configurations among these 5 SR configurations can be different. It is assumed that the priority order of the logical channels associated with these 5 SR configurations is: a logical channel associated with the SR0 configuration>a logical channel associated with the SR1 configuration>a logical channel associated with the SR2 configuration>a logical channel associated with the SR3 configuration>a logical channel associated with the SR4 configuration, and then the terminal device may select the SR0 configuration corresponding to the logical channel with the highest priority as the first configuration, or select the SR4 configuration corresponding to the logical channel with the lowest priority as the first configuration.

If the terminal device selects the SR0 configuration corresponding to the logical channel with the highest priority as the first configuration, that is, the terminal device can first transmit the beam failure information to the network device based on the first configuration, thereby reducing the delay of the BFR procedure.

If the terminal device selects the SR4 configuration corresponding to the logical channel with the lowest priority as the first configuration, the terminal device can transmit the beam failure information to the network device based on the first configuration later, so that it does not interfere with the transmission of data or information based on other SR configurations.

It should be understood that the priority order of the logical channels associated with the above SR configuration is only an example for illustration, and other orders may also be possible, and should not pose any limitation on the present disclosure.

Optionally, in some embodiments, the first configuration may be randomly selected from the configuration set.

In the embodiments of the present disclosure, in the case where the beam failure occurs in the SCell of the terminal device, the request message is generated. The configuration of the request message may be a configuration randomly selected by the terminal device from the configuration set, and the terminal device may transmit the request message to the network device based on the randomly selected configuration. Since the first configuration is randomly selected by the terminal device from the configuration set, the time for selecting the configuration can be reduced, so that the system delay can be reduced.

The foregoing describes the case where the configuration of the request message is the first configuration, the terminal device can generate the request message based on the first configuration and/or transmit the corresponding request message to the network device. In some embodiments, the configuration of the request message can also be the second configuration, the following will introduce a case where the configuration of the request message is the second configuration.

Optionally, in some embodiments, a scheduling request identifier of the second configuration is different from a scheduling request identifier corresponding to the configuration of the scheduling request associated with the logical channel; and/or, a scheduling request resource identifier corresponding to the second configuration is different from a scheduling request resource identifier corresponding to the configuration of the scheduling request associated with the logical channel.

In the embodiments of the present disclosure, in order to avoid confusion with the SR configuration, the scheduling request identifier of the second configuration in the embodiments of the present disclosure may be different from the SR identifier corresponding to the SR configuration associated with the logical channel, and/or the scheduling request resource identifier of the second configuration may be different from the SR resource identifier corresponding to the SR configuration associated with the logical channel. In the case where the beam failure occurs in the SCell of the terminal device, the terminal device may generate the request message based on the second configuration, and/or transmit the request message to the network device, so as to avoid affecting the processing of the logical channel associated with the SR configuration.

Optionally, in some embodiments, some or all parameter types of the second configuration are the same as some or all parameter types of the configuration of the scheduling request associated with the logical channel.

In the embodiments of the present disclosure, if the configuration of the request message is the second configuration, although the second configuration may not be associated with the logical channel, some of the parameter types of the configuration of the message may be the same as some parameter types of the SR configuration, or all parameter types of the configuration of the message may be the same as all parameter types of the SR configuration. For example, the second configuration may have a corresponding message identifier, and/or the second configuration may have a corresponding message resource identifier, and/or the resource configuration corresponding to the second configuration may also include PUCCH resource indication information.

Optionally, in some embodiments, a value of the scheduling request identifier of the second configuration is an integer greater than or equal to 8.

In general, a value of the SR ID corresponding to the SR configuration associated with the logical channel may be an integer from 0 to 7, and the value of the scheduling request ID of the second configuration in the embodiments of the present disclosure may be an integer greater than or equal to 8.

For example, if the SR configurations associated with the logical channel include 8 SR configurations, and corresponding SR IDs thereof are 0, 1, 2, 3, 4, 5, 6, and 7 in sequence. Then, the value of the scheduling request ID of the second configuration can be 8 or 9 or 10, as long as it is an integer greater than or equal to 8, which is not specifically limited in the present disclosure.

In the embodiments of the present disclosure, the value of the SR ID corresponding to the SR configuration associated with the logical channel can be an integer from 0 to 7. If the SR configurations that are associated with the logical channel and configured by the network device for the terminal device include 5 SR configurations, corresponding SR IDs thereof can be 0, 1, 2, 3, 4 in sequence; corresponding SR IDs thereof can also be 1, 2, 3, 4, 5 in sequence; corresponding SR IDs thereof can also be 2, 3, 4, 5, 6 in sequence. The value of the scheduling request ID of the second configuration in the embodiments of the present disclosure can still be an integer greater than or equal to 8. That is, regardless of the number of SR configurations that are associated with the logical channel and configured by the network device for the terminal device, the value of the scheduling request ID of the second configuration in the embodiments of the present disclosure is still an integer greater than or equal to 8.

Optionally, in some embodiments, the value of the scheduling request resource identifier of the second configuration is an integer greater than or equal to 9 or equal to 0.

In general, the value of the SR resource ID corresponding to the SR configuration associated with the logical channel can be an integer from 1 to 8. The value of the scheduling request resource ID of the second configuration in the embodiments of the present disclosure can be an integer greater than or equal to 9, or can be 0.

For example, the SR configurations associated with the logical channels include 8 SR configurations, and corresponding SR resource IDs of the 8 SR configurations are 1, 2, 3, 4, 5, 6, 7, and 8 in sequence. Then, the value of the scheduling request resource ID of the second configuration can be 9 or 10, as long as it is an integer greater than or equal to 9, or can be 0, which is not specifically limited in the present disclosure.

It should be understood that the value of the SR resource ID corresponding to the SR configuration associated with the logical channel can be an integer from 1 to 8. If the SR configurations that are associated with the logical channel and configured by the network device for the terminal device include 5 SR configurations, the corresponding SR IDs of the 5 SR configurations can be 1, 2, 3, 4, 5 in sequence; the corresponding SR IDs of the 5 SR configurations can also be 2, 3, 4, 5, 6 in sequence; or the corresponding SR IDs of the 5 SR configurations can also be 3, 4, 5, 6, 7 in sequence. The value of the scheduling request resource ID of the second configuration is still an integer greater than or equal to 9, or 0 in the embodiments of the present disclosure. In other words, regardless of the number of SR configurations that are associated with the logical channels and configured by the network device for the terminal device, the value of the scheduling request ID of the second configuration in the embodiments of the present disclosure is still an integer greater than or equal to 9, or 0.

Optionally, in some embodiments, the second configuration indicates a PUCCH resource.

In the embodiments of the present disclosure, the second configuration may indicate the PUCCH resource, and the request message may be carried on the PUCCH resource indicated by the second configuration. That is, in the case where the beam failure occurs in the SCell, the terminal device may transmit the request message to the network device based on the PUCCH resource indicated by the second configuration.

In general, the SR resource configuration corresponding to the SR configuration associated with the logical channel may or may not include PUCCH resource indication information. In a case where the SR resource configuration corresponding to the SR configuration associated with the logical channel does not include the PUCCH resource indication information, it may be necessary to be based on the RACH resource for transmission. The second configuration in the embodiments of the present disclosure can indicate the PUCCH resource, and the terminal device can transmit the request message to the network device based on the PUCCH resource, which can avoid backoff to use the RACH resource for transmission, thereby reducing the delay of the BFR procedure.

Optionally, in some embodiments, signaling corresponding to the second configuration includes a mandatory field to indicate the PUCCH resource.

In the embodiments of the present disclosure, a mandatory field may be used to indicate the PUCCH resource. Since the second configuration may include the PUCCH resource indication information, the terminal device can transmit the request message to the network device through the PUCCH resource indicated by the PUCCH resource indication information, and the PUCCH resource may be indicated by one mandatory field. In this case, since the second configuration may include one mandatory field to indicate the PUCCH resource, it is possible to avoid backoff to use the RACH resource for transmission, thereby reducing the delay of the BFR procedure.

Optionally, in some embodiments, a PUCCH format corresponding to the PUCCH resource is PUCCH format 0 or PUCCH format 1.

In the embodiments of the present disclosure, the format corresponding to the PUCCH resource may be PUCCH format 0 or PUCCH format 1. It will be appreciated that the format corresponding to the PUCCH resource may include format 0, format 1, format 2, format 3, and format 4, lengths of such formats in the orthogonal frequency division multiplexing (OFDM) symbols are respectively 1-2, 4-14, 1-2, 4-14, 4-14. Among these 5 formats, bit numbers of format 0 and format 1 is less than or equal to 2, and bit numbers of format 2, format 3 and format 4 are all greater than 2.

Therefore, the PUCCH format corresponding to the PUCCH resource in the embodiments of the present disclosure may be format 0 and format 1, so that the number of transmitted bits is small during the transmission.

Optionally, the second configuration is indicated by configuration information corresponding to the BFR.

In the embodiments of the present disclosure, the second configuration may also be indicated by the configuration information corresponding to the BFR. For example, the second configuration can be indicated through the IE in the configuration information related to the BFR. It will be appreciated that since the second configuration can be the scheduling request configuration not associated with the logical channel, the IE in the BFR configuration message can indicate the configuration to the terminal device based on this principle, and the terminal device can transmit the request message to the network device through the PUCCH resource based on the configuration indicated by the IE in the configuration message related to the BFR.

Optionally, for generating the request message based on the second configuration, the subsequent processing procedure may use a processing procedure similar to the scheduling request (for example, how the request message is transmitted to the network, etc.), which will not be repeated here.

The above describes the configuration of the request message. In some cases, the terminal device needs to transmit data to the network device, meanwhile, the beam failure occurs and the terminal device needs to transmit the beam failure information to the network device, the handling of the terminal device in this case will be described in detail below.

Optionally, in some embodiments, a priority of information transmission may be determined according to one or more of the following rules:

a1: a priority of transmitting beam failure information of the SCell is higher than a priority of transmitting any logical channel.

a2: the priority of transmitting the beam failure information of the SCell is higher than a priority of transmitting cell-radio network temporary identifier (C-RNTI) information or data from an uplink common control channel (UL-CCCH).

a3: the priority of transmitting the beam failure information of the SCell is lower than the priority of transmitting the C-RNTI information or the data from the UL-CCCH, and higher than a priority of transmitting configured grant confirmation information.

a4: the priority of transmitting the beam failure information of the SCell is the same as the priority of transmitting the C-RNTI information or the data from the UL-CCCH.

a5: the priority of transmitting the beam failure information of the SCell is the same as the priority of transmitting the configured grant confirmation information.

a6: the priority of transmitting the beam failure information of the SCell is lower than the priority of transmitting the configured grant confirmation information and higher than a priority of transmitting buffer status report (BSR) information.

a7: the priority of transmitting the beam failure information of the SCell is the same as the priority of transmitting the BSR information.

a8: the priority of transmitting the beam failure information of the SCell is lower than the priority of transmitting the BSR information, and higher than a priority of transmitting a single piece of power headroom report (PHR) information or multiple pieces of PHR information.

The configuration of the request message as the first configuration is taken as an example for description. In the embodiments of the present disclosure, according to the rule a1, when the beam failure information and the logical channel-based data need to be transmitted at the same time, the beam failure information is transmitted first.

For example, if there are 4 SR configurations associated with the logical channel, namely SR0 configuration, SR1 configuration, SR2 configuration, and SR3 configuration, different logical channels can carry different data. For example, a logical channel 0 associated with the SR0 configuration can carry the C-RNTI MAC CE or the data from UL-CCCH, a logical channel 1 associated with the SR1 configuration carries the configured grant confirmation information, for example, configured grant confirmation MAC CE, a logical channel 2 associated with the SR2 configuration carries BSR information other than that including the padding BSR, and a logical channel 3 associated with the SR3 configuration carries a single piece of PHR information or multiple pieces of PHR information. Based on the rule a1, since such 4 SR configurations are all associated with different logical channels, the beam failure information of the SCell can be transmitted preferentially.

According to the rule a2, when the terminal device needs to transmit the beam failure information of the SCell and the C-RNTI MAC CE or the data from the UL-CCCH to the network device at the same time, the beam failure information of the SCell can be transmitted first.

In the embodiments of the present disclosure, if the terminal device requests the uplink transmission resource from the network device based on the SR0 configuration, the logical channel associated with the SR0 configuration can carry the C-RNTI MAC CE or the data from the UL-CCCH. After the network device allocates resources to the terminal device, if the allocated resources cannot transmit the above data at the same time, the terminal device can transmit the beam failure information first based on the allocated resource, and then transmit the C-RNTI MAC CE or the data from the UL-CCCH to the network device.

According to the rule a3, when the terminal device needs to transmit the beam failure information of the SCell and the C-RNTI MAC CE or the data from the UL-CCCH to the network device at the same time, it can transmit the C-RNTI MAC CE or the data from the UL-CCCH first.

The specific transmission process can be similar to the process of the rule a2, except that the information to be transmitted preferentially is different. Reference may be made to the process of the rule a2, which will not be repeated here.

According to the rule a4, when the terminal device needs to transmit the beam failure information of the SCell and the C-RNTI MAC CE or the data from the UL-CCCH to the network device at the same time, the terminal device can select any one of them for transmission, that is, the C-RNTI MAC CE or the data from the UL-CCCH can be transmitted preferentially; alternatively, the beam failure information of the SCell can also be transmitted preferentially.

According to the rule a5, when the terminal device needs to transmit the beam failure information of the SCell and the configured grant confirmation information to the network device at the same time, the terminal device can select any one of them for transmission, that is, the beam failure information of the SCell can be transmitted preferentially; alternatively, the configured grant confirmation information can be transmitted first.

According to the rule a6, when the terminal device needs to transmit the beam failure information of the SCell and the configured grant confirmation information to the network device at the same time, the terminal device can transmit the configured grant confirmation information first.

According to the rule a7, when the terminal device needs to transmit the beam failure information of the SCell and the BSR information to the network device at the same time, the beam failure information of the SCell can be transmitted preferentially. The BSR information may be BSR information other than that including the padding BSR; or the BSR information other than that including the padding BSR may also be transmitted first.

According to the rule a8, when the terminal device needs to transmit the beam failure information of the SCell and the BSR information to the network device at the same time, the BSR information can be transmitted preferentially. The BSR information may be BSR information other than that including the padding BSR.

In the embodiments of the present disclosure, if the network device allocates more resources to the terminal device after the terminal device requests the uplink transmission resource from the network device, multiple types of data or information can also be uploaded to the network device at the same time.

For example, taking the rule a2 as an example, when the terminal device needs to transmit the beam failure information of the SCell and the C-RNTI MAC CE or the data from the UL-CCCH to the network device at the same time, the terminal device can transmit the beam failure information of the SCell first, and then transmit the C-RNTI MAC CE or the data from the UL-CCCH. If the network device allocates more resources to the terminal device after the terminal device transmits the request message to the network device, that is, these resources can be used to transmit the beam failure information of the SCell and the C-RNTI MAC CE or the data from the UL-CCCH at the same time, the terminal device can use these resources to simultaneously transmit the beam failure information of the SCell and the C-RNTI MAC CE or the data from the UL-CCCH to the network device.

It will be appreciated that if the network device allocates more resources to the terminal device, these resources can simultaneously carry the beam failure information of the SCell, the C-RNTI MAC CE or the data from the UL-CCCH, the configured grant confirmation MAC CE, the BSR MAC CE and the single piece of PHR information or the multiple pieces of PHR information, the terminal device can use the allocated resources to simultaneously transmit the above-mentioned data or information to the network device.

Similarly, if other rules are followed, after the network device allocates corresponding resources to the terminal device, the terminal device may also determine the amount of data to be sent according to the amount of allocated resources. For the sake of brevity, it will not be repeated here.

In some implementations, if there is a resource for transmitting other data or information, information with a higher priority can be transmitted along with the resource.

For example, taking the rule a2 as an example, if there is an uplink transmission resource for transmitting the C-RNTI MAC CE or the data from the UL-CCCH, the beam failure information can be transmitted to the network device along with the C-RNTI MAC CE or the data from UL-CCCH in the case where the beam failure occurs in the SCell. If there are more uplink transmission resources, the configured grant confirmation information, the BSR information, and the single piece of PHR information or the multiple pieces of PHR information can also be sent to the network device together. The priority order for transmission can be the beam failure information, the grant confirmation information, the BSR information, and the single piece of PHR information or the multiple pieces of PHR information.

In other words, if the uplink transmission resource can be used to transmit 2 pieces of information at the same time, the C-RNTI MAC CE/the data from the UL-CCCH and the beam failure information can be sent to the network device together; if the uplink transmission resource can be used to transmit 3 pieces of information at the same time, the C-RNTI MAC CE/the data from the UL-CCCH, the beam failure information, and the configuration confirmation information can be sent to the network device together; if the uplink transmission resource can be used to transmit 4 pieces of information at the same time, the C-RNTI MAC CE/the data from the UL-CCCH, the beam failure information, the configuration confirmation information and the BSR information can be sent to the network device together.

Optionally, in some embodiments, the request message is transmitted on a special cell of the terminal device, and the special cell of the terminal device may include the PCell or the PSCell of the terminal device.

In the embodiments of the present disclosure, in the case where the beam failure occurs in the SCell of the terminal device, the corresponding PCell or PSCell can still transmit messages or information normally. Therefore, in the case where the beam failure occurs in the SCell of the terminal device, the terminal device may transmit the request message to the network device based on the PCell or the PSCell.

Optionally, in some embodiments, the beam failure information of the SCell is transmitted on the special cell of the terminal device, and the special cell may include the PCell or the PSCell of the terminal device.

Similarly, in the case where the beam failure occurs in the SCell of the terminal device, the corresponding PCell or PSCell can still transmit messages or information normally. Therefore, the terminal device can transmit the request message to the network device based on PCell or PSCell thereof. After the network device allocates a resource to the terminal device, the terminal device can also transmit the beam failure information of the SCell to the network device on the allocated resource based on the PCell or PSCell.

Optionally, in some embodiments, the beam failure information of the SCell is transmitted through the MAC CE.

In the embodiments of the present disclosure, the beam failure information sent to the network device from the terminal device may be transmitted through the MAC CE. The MAC CE in the embodiments of the present disclosure can indicate the cell where the beam failure occurs, or indicate a new beam indicated by the CSI-RS resource or the SS/PBCH block, and may also indicate, through a specific value, that no beam meets a preset condition.

Optionally, in some embodiments, the beam failure information is carried on a first resource, and the first resource is a resource indicated by a response message for the request message.

In the embodiments of the present disclosure, the terminal device may transmit the beam failure information to the network device through the first resource, and the first resource may be the resource indicated by the response message for the request message sent to the network device from the terminal device. For example, after the terminal device transmits the request message to the network device, the network device indicates a resource to the terminal device in response to the request message, so that the terminal device can transmit the beam failure information on the resource indicated by the network device.

The above illustrates that the terminal device can transmit the request message to the network device to request the uplink transmission resource, thereby transmitting the beam failure information of the SCell to the network device through the requested resource. However, the BFR of the SCell will not succeed every time. In some cases, the BFR of the SCell may also fail, which will be described in detail below.

Optionally, in some embodiments, in a case where a transmission number of the request message is greater than, or greater than or equal to a maximum transmission number indicated by the configuration of the request message, the terminal device confirms that the BFR of the SCell fails; or in a case where the beam failure information of the SCell is sent to the network device and no feedback information or a response message for the beam failure information of the SCell is received, the terminal device confirms that the BFR of the SCell fails.

The transmission number of the request message being greater than or, or greater than or equal to the maximum transmission number of the configuration of the request message is taken as an example for illustration.

In the embodiments of the present disclosure, the configuration of the request message can be configured with the maximum transmission number, and the terminal device transmits the request message to the network device. The network device may not receive the request message due to poor channel quality or other reasons, or the network device receives the request message but fails to allocate the resource to the terminal device due to the channel quality problem. Accordingly, the terminal device can transmit the request messages to the network device multiple times.

If the number of times that the terminal device transmits the request message to the network device is greater than the maximum transmission number corresponding to the configuration of the request message, the terminal device confirms that the BFR of the SCell fails. For example, assuming that the maximum transmission number corresponding to the configuration of the request message is 10, and no resource allocated by the network device is received after the terminal device transmits the request message to the network device for the 10th time, in this case, when the terminal device is ready to transmit the request message to the network device again, since the maximum transmission number corresponding to the configuration of the request message has been exceeded, it can be confirmed that the BFR of the SCell of the terminal device fails.

The terminal device may also confirm whether the BFR of the terminal device succeeds or fails by whether it receives the feedback information or the response message for the beam failure information of the SCell. Specifically, after the terminal device requests the network device for the uplink transmission resource and the network device allocates the resource to the terminal device, the terminal device may transmit the beam failure information of the SCell to the network device based on this resource. If the terminal device does not receive the feedback information or the response message for the beam failure information of the SCell, it can be confirmed that the BFR of the SCell of the terminal device fails. For example, the feedback message may be hybrid automatic repeat request-acknowledgement (HARQ-ACK) information, and the response message may be a configuration signaling related to the beam management procedure corresponding to the S Cell, such as radio resource control (RRC) signaling, or MAC CE signaling, or beam measurement reporting triggered by downlink control information (DCI); if the terminal device confirms that it receives the feedback information or the response message for the beam failure information of the SCell, for example, the HARQ-ACK information or the configuration signaling related to the beam management procedure corresponding to the SCell, or the MAC CE signaling, or the beam measurement reporting triggered by DCI, it can be confirmed that the BFR of the SCell of the terminal device succeeds.

Optionally, in some embodiments, the terminal device transmits the beam failure information of the SCell to the network device; if no feedback information or no response message for the beam failure information of the SCell is received when a BFR timer of the SCell ends, the terminal device confirms that the BFR of the SCell fails.

Optionally, if the feedback information or the response message for the SCell beam failure information has been received before the timer of the BFR of the SCell ends, the terminal device confirms that the BFR of the SCell is successful.

In the embodiments of the present disclosure, the configuration message related to the BFR or the configuration of the request message can configure the BFR timer, and the BFR timer can monitor the entire procedure time of the BFR. If the terminal device has not received the feedback information or the response message for the beam failure information of the SCell from the time when the terminal device transmits the request message to the network device to the time when the BFR timer ends, it can be confirmed that the BFR of the SCell of the terminal device fails; and if the terminal device has received the feedback information or the response message for the beam failure information of the SCell before the BFR timer of the SCell ends, it can be confirmed that the BFR of the SCell of the terminal device succeeds.

In the wireless communication method provided by the present disclosure, since the BFR timer is added, the entire procedure time of the BFR can be monitored, so that the delay of the BFR procedure can be better controlled.

It will be appreciated that if no BFR timer is configured, the terminal device may take a long time to receive the beam failure information of the SCell since there is no duration constraint. In this case, it can be considered that the BFR of the SCell of the terminal device succeeds.

Optionally, in some embodiments, if it is confirmed that the BFR of the SCell of the terminal device fails, the SCell of the terminal device is deactivated.

In the embodiments of the present disclosure, if the terminal device confirms that the BFR of its SCell fails, the SCell of the terminal device can be deactivated, that is, the SCell is no longer used.

Optionally, in some embodiments, in response to the success of the BFR of the SCell, the BFR timer of the SCell is stopped.

Optionally, in some embodiments, in response to the success of the BFR of the SCell, a counter used to determine the occurrence of the beam failure of the SCell is reset to 0.

In the embodiments of the present disclosure, when the terminal device confirms that the BFR of its SCell succeeds, the BFR timer of the SCell can be stopped. It will be appreciated that the BFR timer of the SCell is used to monitor the duration of the BFR of the SCell. Therefore, when the terminal device confirms that the BFR of its SCell succeeds, it can stop the BFR timer of the SCell in response to the success of the BFR of the SCell.

The counter in the embodiments of the present disclosure is used to determine the occurrence of the beam failure of the SCell. That is, within a certain period, if the number of BFIs counted by the counter is within a certain value, it can be considered that no beam failure occurs in the SCell of the terminal device. If the number of BFIs counted by the counter exceeds the certain value, it can be considered that the beam failure occurs in the SCell of the terminal device. Therefore, when the terminal device confirms that the BFR of its SCell succeeds, it can reset the counter used to determine the occurrence of beam failure of the SCell to 0 in response to the success of the BFR of the SCell.

Optionally, in some embodiments, the timer is configured by the network device for the terminal device.

Optionally, in some embodiments, the timer is configured by the network device for the terminal device through the RRC signaling.

In the embodiments of the present disclosure, the BFR timer of the SCell may be configured by the network device for the terminal device. Further, the BFR timer of the SCell may be configured by the network device for the terminal device through the RRC signaling. A duration of the configured BFR timer may also be determined by the network device, for example, it may be 100 ms or 1 s, which is not specifically limited in the present disclosure.

Optionally, in some embodiments, a time for starting or restarting the timer is one of the following times:

when detecting that the beam failure occurs in the secondary cell by the terminal device; after detecting that the beam failure occurs in the secondary cell by the terminal device; when generating the request message; before generating the request message; after generating the request message; when transmitting the request message; before transmitting the request message; after transmitting the request message; when transmitting the beam failure information of the secondary cell; before transmitting the beam failure information of the secondary cell; and after transmitting the beam failure information of the secondary cell.

In the embodiments of the present disclosure, the terminal device may start the BFR timer when detecting that the beam failure occurs in the SCell, or may start the BFR timer after detecting that the beam failure occurs in the SCell. As for how long the terminal device starts the BFR timer after detecting the beam failure occurs in the SCell, it can be determined by the terminal device. For example, the terminal device can start the BFR timer after 2 ms since the beam failure occurring in the SCell is detected.

The numerical values in the embodiments of the present disclosure are merely examples, and may also be other numerical values, which are not specifically limited in the present disclosure.

Similarly, the process of starting or restarting the BFR timer in other cases is similar to the above process, and for the sake of brevity, it will not be repeated here.

Therefore, according to the wireless communication method provided by the present disclosure, in the case where the beam failure occurs in the SCell, the terminal device can generate the request message according to the first configuration or the second configuration, and optionally, transmit the request message to the network device to request the uplink transmission resource from the network device or notifies the network device that the beam failure occurs in the SCell of the terminal device. After receiving the first message or notification transmitted from the terminal device, the network device can allocate a resource to the terminal device, so that the terminal device can transmit the beam failure information of the SCell to the network device. Further, the transmission of the beam failure information can take precedence over the transmission of other data or information, thereby reducing a delay of the BFR procedure.

FIG. 4 is a schematic flowchart of a wireless communication method 400 provided by another embodiment of the present disclosure. As shown in FIG. 4, the method 400 may include steps 410-430.

In step 410, a network device transmits configuration information to a terminal device, and the configuration information is used for configuring a PUCCH resource.

In step 420, the terminal device receives the configuration information.

In step 430, in a case where a beam failure occurs in a SCell, the terminal device uses the PUCCH resource to transmit a reporting message and/or uses a PUSCH resource to transmit a MAC CE.

In the embodiments of the present disclosure, the terminal device using the PUCCH resource to transmit the reporting message may mean that the terminal device uses the PUCCH resource to transmit the reporting message to the network device, and the terminal device using the PUSCH resource to transmit the MAC CE may mean that the terminal device uses the PUSCH resource to transmit the MAC CE corresponding to the beam failure information of the SCell to the network device.

In the embodiments of the present disclosure, if the beam failure occurs in the SCell of the terminal device, the terminal device may transmit the reporting message to the network device through the PUCCH resource configured by the network device for the terminal device, and/or may transmit the MAC CE to the network device through the PUSCH resource.

The beam failure information of the SCell in the embodiments of the present disclosure can indicate a cell where the beam failure occurs, a beam on which the beam failure occurs, or a new beam. The beam failure information can also indicate that there are no beams that meet a preset condition.

The PUSCH resource in the embodiments of the present disclosure can be a resource indicated by the response message for the reporting message transmitted by the terminal device to the network device, or it can be a periodic or semi-persistent PUSCH resource, or it can be a PUSCH resource used by the terminal device to transmit other data.

In the wireless communication method provided by the present disclosure, the network device can transmit the configuration information to the terminal device, and the configuration information can be used to configure the PUCCH resource. In the case where the beam failure occurs in the SCell, the terminal device can use the PUCCH resource to transmit the reporting message and/or use the PUSCH resource to transmit the MAC CE, so that the BFR procedure of the SCell can be realized.

Optionally, in some embodiments, in response to one or more of the following conditions being satisfied, transmission of the reporting message at a current effective transmission time of the PUCCH resource is canceled or stopped:

b1: a first timer corresponding to the PUCCH resource is running at the current effective transmission time of the PUCCH resource, and the first timer is used to control a transmission interval of the PUCCH resource.

b2: the current effective transmission time of the PUCCH resource overlaps with a first PUSCH resource included in the PUSCH resource.

b3: a second PUSCH resource included in the PUSCH resource is within a first time period or a second time period, an end time of the first time period is earlier than the current effective transmission time or is a time within the current effective transmission time, and a start time of the second time period is later than the current effective transmission time or is a time within the current effective transmission time.

b4: there is downlink control information (DCI) for scheduling a third PUSCH resource included in the PUSCH resource in a third time period or a fourth time period, an end time of the third time period is earlier than the current effective transmission time or is a time within the current effective transmission time, and a start time of the fourth time period is later than the current effective transmission time or is a time within the current effective transmission time.

b5: the current effective transmission time of the PUCCH resource overlaps with a measurement gap.

b6: a second timer corresponding to the configuration of the PUCCH resource stops or expires at the current effective transmission time of the PUCCH resource, and the second timer is used to control a maximum transmission time for transmitting the PUCCH resource.

b7: the current effective transmission time of the PUCCH resource overlaps with a transmission resource carrying HARQ information, and the transmission resource corresponds to a time domain resource used for transmission.

b8: the current effective transmission time of the PUCCH resource overlaps with a transmission resource corresponding to the scheduling request, and the transmission resource corresponds to the time domain resource used for transmission.

b9: before the current effective transmission time of the PUCCH resource, DCI for scheduling a fourth PUSCH resource is received by the terminal device, and the DCI is a response message for the reporting message transmitted on previous effective transmission time of the PUSCH resource.

b10: before the current effective transmission time of the PUCCH resource, the MAC CE is transmitted by the terminal device through the PUSCH resource or the MAC CE is successfully transmitted by the terminal device through the PUSCH resource.

In the embodiments of the present disclosure, the condition b1 is taken as an example for illustration. If the first timer used to control the transmission interval of the PUCCH resource runs at the current effective time of the PUCCH resource, the transmission of the reporting message at the current effective transmission time of the PUCCH resource is canceled or stopped.

In the embodiments of the present disclosure, the first timer can be used to control the transmission interval of the PUCCH resource. Assuming a transmission period of the PUCCH resource is 10 ms, if the 3rd ms is the current effective transmission time for transmitting the reporting message through the PUCCH resource, and the first timer is in the running state at this time point (that is, the timer that controls the transmission interval of the PUCCH resource is running), then the transmission of the reporting message by the PUCCH resource in the 3rd ms can be cancelled or stopped.

In the case where the transmission of the reporting message at the current effective transmission time of the PUCCH resource is canceled or stopped, if the first timer is in a stopped state at the next effective transmission time of the PUCCH resource, the reporting message can be transmitted at the next transmission time of the PUCCH resource.

Similarly, the condition b2 is taken as an example for illustration. In the embodiments of the present disclosure, if the current effective transmission time of the PUCCH resource overlaps with the first PUSCH resource included in the PUSCH resource, the transmission of the reporting message at the current effective transmission time of the PUCCH resource can be cancelled or stopped.

Specifically, assuming that the transmission period of the PUCCH resource is 10 ms, if the 3rd ms is the current effective transmission time for transmitting the PUCCH resource, meanwhile a first PUSCH resource is also transmitted in the 3rd ms, then the terminal device can cancel or stop the transmission of the reporting message at the current effective transmission time of the PUCCH resource.

Similarly, the condition b3 is taken as an example for illustration. In the embodiments of the present disclosure, if the second PUSCH resource included in the PUSCH resource is within the first time period or the second time period, the transmission of the reporting message at the current effective transmission time of the PUCCH resource can be cancelled or stopped. The end time of the first time period is earlier than the current effective transmission time or is the time within the current effective transmission time, and the start time of the second time period is later than the current effective transmission time or is the time within the current effective transmission time.

In an implementation, when the terminal device is ready to transmit the reporting message to the network device in the 3rd ms by using the PUCCH resource, if the transmission of the second PUSCH resource exists in the first time period from the 3rd ms, for example, a value of the duration of the first time period is 2 ms, then the terminal device can cancel or stop the transmission of the reporting message at the current transmission time of the PUCCH resource. In other words, if the transmission of the second PUSCH resource exists in the 1st or 2nd ms, the terminal device can cancel or stop the transmission of the reporting message at the current transmission time of the PUCCH resource.

In another implementation, when the terminal device is ready to transmit the reporting message to the network device in the 3rd ms by using the PUCCH resource, if the transmission of the second PUSCH resource exists in the second time period from the 3rd ms, for example, a value of the duration of the second time period is 2 ms, the terminal device can cancel or stop the transmission of the reporting message at the current transmission time of the PUCCH resource. In other words, if the transmission of the second PUSCH resource exists in the 4th or 5th ms, the terminal device can cancel or stop the transmission of the reporting message at the current transmission time of the PUCCH resource.

The second PUSCH resource in the embodiments of the present disclosure may be the same as or different from the first PUSCH resource mentioned above, which is not specifically limited in the present disclosure.

Similarly, the condition b4 is taken as an example for illustration. If there is the DCI for scheduling the third PUSCH resource included in the PUSCH resource in the third time period or the fourth time period, the transmission of the reporting message at the current effective transmission time of the PUCCH resource can be cancelled or stopped. The end time of the third time period is earlier than the current effective transmission time or is the time within the current effective transmission time, and the start time of the fourth time period is later than the current effective transmission time or is the time within the current effective transmission time.

In an implementation, when the terminal device is ready to transmit the reporting message to the network device in the 3rd ms by using the PUCCH resource, if there is the DCI that can schedule the third PUSCH resource in the third time period from the 3rd ms, for example, a value of the duration of the third time period is 2 ms, then the terminal device can cancel or stop the transmission of the reporting message at the current transmission time of the PUCCH resource. In other words, if there is the DCI that can schedule the third PUSCH resource in the 1st or 2nd ms, the terminal device can cancel or stop the transmission of the reporting message at the current transmission time of the PUCCH resource.

In another implementation, when the terminal device is ready to transmit the reporting message to the network device in the 3rd ms by using the PUCCH resource, if there is the DCI that can schedule the third PUSCH resource in the fourth time period from the 3rd ms, for example, a value of the duration of the fourth time period is 2 ms, the terminal device can cancel or stop the transmission of the reporting message at the current transmission time of the PUCCH resource. In other words, if there is the DCI that can schedule the third PUSCH resource in the 4th or 5th ms, the terminal device can cancel or stop the transmission of the reporting message at the current transmission time of the PUCCH resource.

It should be understood that the numerical values in the embodiments of the present disclosure are only examples, and may also be other numerical values, which should not specifically limit the present disclosure.

The third PUSCH resource in the embodiments of the present disclosure may be the same as or different from the first PUSCH resource and the second PUSCH resource mentioned above, which is not limited by the present disclosure.

Similarly, the condition b5 is taken as an example for illustration. In the embodiments of the present disclosure, if the current effective transmission time of the PUCCH resource overlaps with the measurement gap, the transmission of the reporting message at the current effective transmission time of the PUCCH resource can be cancelled or stopped.

In the embodiments of the present disclosure, the measurement gap may refer to the following period: during the measurement gap, the terminal device may not transmit or receive any data, and a receiver is tuned to a target cell frequency point to perform the inter-frequency measurement, when the measurement gap ends, the current cell is turned to. That is to say, after the beam failure occurs in the SCell of the terminal device, if the PCell of the terminal device needs to be used for the measurement gap at this time, the transmission of the reporting message at the current effective transmission time of the PUCCH resource can be cancelled or stopped. After the measurement gap ends, if the PUCCH resource needs to be used to transmit the reporting message, the reporting message can be transmitted at the next effective transmission time of the PUCCH resource.

Similarly, the condition b6 is taken as an example for illustration. In the embodiments of the present disclosure, if the second timer corresponding to the configuration of the PUCCH resource stops or expires at the current effective transmission time of the PUCCH resource, the transmission of the reporting message at the current effective transmission time of the PUCCH resource can be cancelled or stopped.

In the embodiments of the present disclosure, the second timer may be used to control the maximum transmission time for transmitting the reporting message by using PUCCH resources. If the second timer is in the stopped state or expires at the current effective transmission time of the PUCCH resource, in this case, the transmission of the reporting message at the current effective transmission time of the PUCCH resource can be cancelled or stopped.

In the wireless communication method provided by the embodiments of the present disclosure, the second timer can better monitor the time of transmitting the reporting message by using PUCCH resources, and can better control the time of the BFR procedure. Therefore, when the second timer stops or expires, the transmission of the reporting message at the current effective transmission time of the PUCCH resource can be cancelled or stopped.

Optionally, when the second timer is stopped, the current effective transmission time of the PUCCH resource can also be used to transmit the reporting message. Although the second timer is in the stopped state, even if the maximum transmission time for transmitting the reporting message through the PUCCH resource is exceeded, the terminal device may not confirm that the BFR of the SCell fails due to the expiration. Therefore, the terminal device can still use the PUCCH resource to continue to transmit the reporting message.

Similarly, the condition b7 is taken as an example for illustration. In the embodiments of the present disclosure, if the current effective transmission time of the PUCCH resource overlaps with the transmission resource carrying HARQ information, the transmission of the reporting message at the current effective transmission time of the PUCCH resource can be cancelled or stopped.

In the embodiments of the present disclosure, assuming the transmission period of the PUCCH resource is 10 ms, if the 3rd ms is the current effective transmission time for transmitting the PUCCH resource, at this time, and a resource carrying the HARQ information is also transmitted in the 3rd ms, then the terminal device can cancel or stop transmitting the reporting message through the current effective transmission time of the PUCCH resource. In this case, the terminal device can preferentially transmit the resource carrying the HARQ information.

Similarly, the condition b8 is taken as an example for illustration. If the current effective transmission time of the PUCCH resource overlaps with the transmission resource corresponding to the scheduling request, the transmission of the reporting message at the current effective transmission time of the PUCCH resource can be cancelled or stopped.

In the embodiments of the present disclosure, assuming the transmission period of the PUCCH resource is 10 ms, if the 3rd ms is the current effective transmission time for transmitting the PUCCH resource, meanwhile the transmission resource corresponding to the scheduling request is also transmitted in the 3rd ms, then the terminal device can cancel or stop transmitting the reporting message by using the current effective transmission time of the PUCCH resource. In this case, the terminal device can preferentially transmit the scheduling request.

In the embodiments of the present disclosure, the uplink transmission carrying the HARQ information or the uplink transmission corresponding to the scheduling request can be transmitted preferentially, and then the reporting message is transmitted through the PUCCH resource.

Similarly, the condition b9 is taken as an example for illustration. In the embodiments of the present disclosure, if the terminal device receives the DCI for scheduling the fourth PUSCH resource included in the PUSCH resource before the current effective transmission time of the PUCCH resource, the transmission of the reporting message at the current effective transmission time of the PUCCH resource can be cancelled or stopped.

In the embodiments of the present disclosure, the terminal device can transmit the reporting message to the terminal device through the PUCCH resource. After receiving the reporting message, the network device can transmit the DCI to the terminal device based on the reporting message. The DCI can schedule the fourth PUSCH resource through which the terminal device transmits the MAC CE, and thus the transmission of the reporting message at the current effective transmission time of the PUCCH resource can be cancelled or stopped.

The DCI in the embodiments of the present disclosure may be the response message for the reporting message transmitted to the network device from the terminal device, or may be DCI based on normal service scheduling, and the terminal device may transmit the MAC CE based on the fourth PUSCH resource scheduled by the DCI.

Similarly, the condition b10 is taken as an example for illustration. If the terminal device transmits the MAC CE through the PUSCH resource or successfully transmits the MAC CE though the PUSCH resource before the current effective transmission time of the PUCCH resource, the transmission of the reporting message at the current effective transmission time of the PUCCH resource can be cancelled or stopped.

In the embodiments of the present disclosure, the terminal device can transmit the MAC CE to the network device through the PUSCH resource. If the terminal device transmits the MAC CE through the PUSCH resource or successfully transmits the MAC CE through the PUSCH resource before the current effective transmission time of the PUCCH resource, the transmission of the reporting message at the current effective transmission time of the PUCCH resource can be cancelled or stopped.

Specifically, in the embodiments of the present disclosure, assuming the transmission period of the PUCCH resource is 10 ms, if the 3rd ms is the current effective transmission time for transmitting the PUCCH resource, meanwhile the MAC CE is transmitted or successfully transmitted through the PUSCH resource before the 3rd ms, then the transmission of the reporting message at the 3rd ms through the PUCCH resource can be cancelled or stopped The above illustrates that in some cases, the transmission of the reporting message at the current effective transmission time of the PUCCH resource can be cancelled or stopped. The following will describe the transmission of the reporting message at the current effective transmission time of the PUCCH resource in some cases, that is, the reporting message is transmitted at the current effective transmission time of the PUCCH resource.

Optionally, in some embodiments, when some or all of the following conditions are satisfied, the reporting message can be transmitted at the current effective transmission time of the PUCCH resource:

c1: the first timer corresponding to the PUCCH resource stops at the current effective transmission time of the PUCCH resource, and the first timer is used to control a transmission interval of the PUCCH resource.

c2: the current effective transmission time of the PUCCH resource does not overlap with the PUSCH resource.

c3: the current effective transmission time of the PUCCH resource does not overlap with the measurement gap.

c4: the second timer corresponding to the PUCCH resource is running at the current effective transmission time of the PUCCH resource, and the second timer is used to control the maximum transmission time for transmitting the PUCCH resource.

c5: the current effective transmission time of the PUCCH resource does not overlap with the transmission resource carrying HARQ information, and the transmission resource corresponds to a time domain resource used for transmission.

c6: the current effective transmission time of the PUCCH resource does not overlap with a transmission resource corresponding to the scheduling request, and the transmission resource corresponds to the time domain resource used for transmission.

c7: before the current effective transmission time of the PUCCH resource, no DCI for scheduling the PUSCH resource is received by the terminal device.

c8: no DCI for scheduling the PUSCH resource is received in a third time period or a fourth time period, an end time of the third time period is earlier than the current effective transmission time or is a time within the current effective transmission time, and a start time of the fourth time period is later than the current effective transmission time or is a time within the current effective transmission time.

c9: before the current effective transmission time of the PUCCH resource, the MAC CE is not transmitted by the terminal device through the PUSCH resource.

c10: before the current effective transmission time of the PUCCH resource, the transmission, through the PUSCH resource, of the MAC CE by the terminal device fails.

In the embodiments of the present disclosure, the condition c1 is taken as an example for illustration. If the first timer is in the stopped state at the current effective transmission time of the PUCCH resource, the current effective transmission time of the PUCCH resource may be used to transmit the MAC CE.

The first timer in the embodiments of the present disclosure can be used to control the transmission interval of the PUCCH resource. Assuming the transmission period of transmitting the reporting message through the PUCCH resource is 10 ms, if the 3rd ms is the current effective transmission time for transmitting the reporting message through the PUCCH resource, the current effective transmission time of the PUCCH resource can be used to transmit the reporting message in the case where the first timer stops or expires, that is, the PUCCH resource can be used to transmit the reporting message in the 3rd ms.

It will be appreciated that, in this case, if the terminal device fails to transmit the reporting message through the current effective transmission time of the PUCCH resource, it can transmit the reporting message by using the next effective transmission time of the PUCCH resource, that is, it can transmit the reporting message at 13 ms through the PUCCH resource (assuming that the relevant conditions are satisfied).

Similarly, the condition c2 is taken as an example for illustration. If the current effective transmission time of the PUCCH resource does not overlap with the PUSCH resource, the current effective transmission time of the PUCCH resource can be used to transmit the reporting message.

As pointed out above, if the current effective transmission time of the PUCCH resource overlaps with the PUSCH resource, the transmission of the reporting message at the current effective transmission time of the PUCCH resource can be canceled or stopped. In this case, for example, the PUSCH resource can be used to transmit the MAC CE, thus the delay of the BFR procedure can be reduced.

In the embodiments of the present disclosure, if the current effective transmission time of the PUCCH resource does not overlap with the PUSCH resource, the current effective transmission time of the PUCCH resource can be used to transmit the reporting message, so that the terminal device can use the requested resource to transmit the MAC CE, and the probability of BFR success can be further increased.

Similarly, the condition c3 is taken as an example for illustration. If the current effective transmission time of the PUCCH resource does not overlap with the measurement gap, the current effective transmission time of the PUCCH resource can be used to transmit the reporting message.

As pointed out above, if the current effective transmission time of the PUCCH resource overlaps with the measurement gap, the transmission of the reporting message at the current effective transmission time of the PUCCH resource can be canceled or stopped. In the embodiments of the present disclosure, if the current effective transmission time of the PUCCH resource does not overlap with the measurement gap, that is, the terminal device can transmit/receive the data or the information normally, so the terminal device can use the current effective transmission time of the PUCCH resource to transmit the reporting message, which can reduce the delay of the BFR procedure.

Similarly, the condition c4 is taken as an example for illustration. If the second timer corresponding to the configuration of the PUCCH resource is running at the current effective transmission time of the PUCCH resource, the second timer is used to control the maximum transmission time for transmitting the PUCCH resource.

As pointed out above, if the second timer stops at the current effective transmission time of the PUCCH resource, the transmission of the reporting message at the current effective transmission time of the PUCCH resource can be canceled or stopped.

In the embodiments of the present disclosure, if the second timer is running at the current effective transmission time of the PUCCH resource, since the second timer can better control the time when the PUCCH resource is used to transmit the reporting message, the reporting message can be transmitted at the current effective transmission time of the PUCCH resource.

Similarly, the condition c5 is taken as an example for illustration. If the current effective transmission time of the PUCCH resource does not overlap with the transmission resource carrying the HARQ information, the current effective transmission time of the PUCCH resource can be used to transmit the reporting message.

As pointed out above, if the current effective transmission time of the PUCCH resource overlaps with the transmission resource carrying the HARQ information, the terminal device can cancel or stop the transmission of the reporting message at the current effective transmission time of the PUCCH resource.

In the embodiments of the present disclosure, if the current effective transmission time of the PUCCH resource does not overlap with the transmission resource carrying the HARQ information, the terminal device can use the current effective transmission time of the PUCCH resource to transmit the reporting message.

Similarly, the condition c6 is taken as an example for illustration. If the current effective transmission time of the PUCCH resource does not overlap with the transmission resource corresponding to the scheduling request, the current effective transmission time of the PUCCH resource can be used to transmit the reporting message.

As pointed out above, if the current effective transmission time of the PUCCH resource overlaps with the transmission resource corresponding to the scheduling request, the terminal device can cancel or stop the transmission of the reporting message at the current effective transmission time of the PUCCH resource.

In the embodiments of the present disclosure, if the current effective transmission time of the PUCCH resource does not overlap with the transmission resource corresponding to the scheduling request, the terminal device may use the current effective transmission time of the PUCCH resource to transmit the reporting message.

Similarly, the condition c7 is taken as an example for illustration. If the terminal device does not receive the DCI for scheduling the PUSCH resource before the current effective transmission time of the PUCCH resource, it can use the current effective transmission time of the PUCCH resource to transmit the reporting message.

As pointed out above, if the terminal device receives the DCI for scheduling the PUSCH resource before the current effective transmission time of the PUCCH resource, it can cancel or stop the transmission of the reporting message at the current effective transmission time of the PUCCH resource.

In the embodiments of the present disclosure, if the terminal device does not receive the DCI for scheduling the PUSCH resource before the current effective transmission time of the PUCCH resource, that is, the terminal device does not have the DCI that can schedule the PUSCH resource, the terminal device can transmit the reporting message at the current effective transmission time of the PUCCH resource, so that the terminal device can transmit the MAC CE based on the resource requested by the reporting message.

Similarly, the condition c8 is taken as an example for illustration. If no DCI for scheduling the PUSCH resource is received in the third time period or the fourth time period, the current effective transmission time of the PUCCH resource can be used to transmit the reporting message. An end time of the third time period is earlier than the current effective transmission time or is the time within the current effective transmission time, and the start time of the fourth time period is later than the current effective transmission time or is the time within the current effective transmission time.

In the embodiments of the present disclosure, if the terminal device does not receive the DCI for scheduling the PUSCH resource in the third time period or the fourth time period, that is, there is no available PUSCH resource to transmit the MAC CE, in this case, the current effective transmission time of the PUCCH resource is used to transmit the reporting message, so that the terminal device can transmit the MAC CE based on the resource requested by the reporting message.

Similarly, the condition c9 is taken as an example for illustration. If the terminal device does not use the PUSCH resource to transmit the MAC CE before the current effective transmission time of the PUCCH resource, it can use the current effective transmission time of the PUCCH resource to transmit the reporting message.

As pointed out above, if the terminal device transmits the MAC CE through the PUSCH resource before the current effective transmission time of the PUCCH resource, it can cancel or stop the transmission of the reporting message at the current effective transmission time of the PUCCH resource.

In the embodiments of the present disclosure, if the terminal device does not transmit the MAC CE through the PUSCH resource before the current effective transmission time of the PUCCH resource, the terminal device can transmit the reporting message at the current effective transmission time of the PUCCH resource, so that the terminal device can transmit the MAC CE based on the resource requested by the reporting message.

Similarly, the condition c10 is taken as an example for illustration. If the terminal device fails to transmit the MAC CE through the PUSCH resource before the current effective transmission time of the PUCCH resource, it may use the current effective transmission time of the PUCCH resource to transmit the reporting message.

As pointed out above, if the terminal device successfully transmits the MAC CE through the PUSCH resource before the current effective transmission time of the PUCCH resource, it can cancel or stop the transmission of the reporting message at the current effective transmission time of the PUCCH resource.

In the embodiments of the present disclosure, if the terminal device can transmit the MAC CE through the PUSCH resource before the current effective transmission time of the PUCCH resource, but the MAC CE transmission is not successful, the terminal device can transmit the reporting message at the current effective transmission time of the PUCCH resource, so that the terminal device can transmit the MAC CE based on the resource requested by the reporting message.

Optionally, in some embodiments, the PUSCH resource includes the fourth PUSCH resource, and the fourth PUSCH resource is a resource indicated by a response message for the reporting message.

In the embodiments of the present disclosure, in the case where the beam failure occurs in the SCell, the terminal device transmits the reporting message to the network device to request the uplink transmission resource from the network device. After receiving the reporting message, the network device may respond to the reporting message to indicate the four PUSCH resource, and the terminal device can transmit the MAC CE based on the fourth PUSCH resource.

Optionally, in some embodiments, the PUSCH resource includes a first PUSCH resource, and the first PUSCH resource overlaps with a current effective transmission time of the PUCCH resource; and/or the PUSCH resource includes a second PUSCH resource, the second PUSCH resource is located in a first time period or a second time period in a time domain, an end time of the first time period is earlier than the current effective transmission time or is a time within the current effective transmission time, and a start time of the second time period is later than the current effective transmission time or is a time within the current effective transmission time; and/or the PUSCH resource includes a third PUSCH resource, DCI for scheduling the third PUSCH resource is located in a third time period or a fourth time period in the time domain, an end time of the third time period is earlier than the current effective transmission time or is a time within the current effective transmission time, and a start time of the fourth time period is later than the current effective transmission time or is a time within the current effective transmission time; and/or the PUSCH resource includes a fifth PUSCH resource, and the fifth PUSCH resource is scheduled by configured grant type 1 or configured grant type 2.

In the embodiments of the present disclosure, if the first PUSCH resource included in the PUSCH resource overlaps with the current effective transmission time of the PUCCH resource, the first PUSCH resource may be used to transmit the MAC CE.

Specifically, assuming the transmission period of transmitting the reporting message through the PUCCH resource is 10 ms, if the 3rd ms is the current effective transmission time for transmitting the PUCCH resource, at this time, the first PUSCH resource is also transmitted in the 3rd ms, then the terminal device cancels or stops the transmission of the reporting message at the current effective transmission time of the PUCCH resource, as pointed out above. In another embodiment, the terminal device may also use the first PUSCH resource to transmit the MAC CE in the 3rd ms.

In the wireless communication method provided by the present disclosure, if the current effective transmission time of the PUCCH resource overlaps with the transmission time of the first PUSCH resource included in the PUSCH resource, the terminal device can transmit the MAC CE based on the first PUSCH resource. In this case, the terminal device can no longer request uplink the transmission resource from the network device through the PUCCH resource, so that the delay of the BFR procedure can be reduced.

In the embodiments of the present disclosure, if the second PUSCH resource included in the PUSCH resource is located in the first time period or the second time period in the time domain, the terminal device can use the second PUSCH resource to transmit the MAC CE to the network device. The end time of the first time period is earlier than the current effective transmission time or is the time within the current effective transmission time, and the start time of the second time period is later than the current effective transmission time or is the time within the current effective transmission time.

In an implementation, when the terminal device is ready to transmit the reporting message to the network device in the 3rd ms through the PUCCH resource, if the transmission of the second PUSCH resource exists within the first time period from the 3rd ms, for example, the value of the duration of the first time period is 2 ms. As pointed out above, the terminal device can cancel or stop the transmission of the reporting message at the current transmission time of the PUCCH resource. In the embodiments of the present disclosure, if the transmission of the second PUSCH resource exists in the 1st ms or the 2nd ms, the terminal device can to transmit the MAC CE to the network device through the second PUSCH resource.

In another embodiment, when the terminal device is ready to transmit the reporting message to the network device in the 3rd ms through the PUCCH resource, if the transmission of the second PUSCH resource exists within the second time period from the 3rd ms, for example, the value of the duration of the second time period is 2 ms. As pointed out above, the terminal device can cancel or stop the transmission of the reporting message at the current transmission time of the PUCCH resource.

In the embodiments of the present disclosure, if the transmission of the second PUSCH resource exists in the 4th ms or the 5th ms, the terminal device can transmit the MAC CE to the network device through the second PUSCH resource.

It should be understood that the above-mentioned numerical values are only examples and should not specifically limit the application. The value of the duration of the first time period is the same as or different from the value of the duration of the second time period in the embodiments of the present disclosure, which is not specifically limited in the present disclosure.

Similarly, the PUSCH resource includes the third PUSCH resource. If the DCI for scheduling the third PUSCH resource is located in the third time period or the fourth time period in the time domain, the terminal device can use the third PUSCH resource to transmit the MAC CE to the network device. The end time of the third time period is earlier than the current effective transmission time or is the time within the current effective transmission time, and the start time of the fourth time period is later than the current effective transmission time or is the time within the current effective transmission time.

In the embodiments of the present disclosure, if there is the DCI that can schedule the third PUSCH resource near the current effective transmission time of the PUCCH resource, in the case where the beam failure occurs in the SCell, the terminal device can use the DCI to schedule the third PUSCH resource, so that the scheduled third PUSCH resource can be used to transmit the MAC CE.

The DCI in the embodiments of the present disclosure may be carried by the PDCCH, and the DCI transmitted from the network device to the terminal device may include uplink and downlink resource allocation, the HARQ information, the power control, and so on. Therefore, when there is no third PUSCH resource for transmission, if the beam failure occurs in the SCell, the third PUSCH resource can be scheduled based on the DCI, so that the third PUSCH resource can be used to transmit the MAC CE.

In the embodiments of the present disclosure, if there is the fifth PUSCH resource scheduled with the configured grant type 1 or type 2, the terminal device can use the fifth PUSCH resource to transmit the MAC CE.

In the embodiments of the present disclosure, in the configured grant type 1, the fifth PUSCH resource can be periodically scheduled within a certain period of time, and the terminal device can use the fifth PUSCH resource to transmit the MAC CE; in the configured grant type 2, the fifth PUSCH resource can be continuously scheduled or scheduled at intervals with the DCI having been triggered, so that the terminal device can use the fifth PUSCH resource to transmit the MAC CE.

Optionally, in some embodiments, if the terminal device successfully transmits the MAC CE through the PUSCH resource, it no longer transmits the reporting message through the PUCCH resource.

Optionally, in some embodiments, in response to that the PUSCH resource is used to transmit the MAC CE or the DCI for scheduling the PUSCH resource is received, the second timer is stopped. The second timer is used to control the maximum transmission time for transmitting the PUCCH resource.

In the embodiments of the present disclosure, in the case where the terminal device uses the PUSCH resource to transmit the MAC CE, that is, the network device can know the beam failure occurs in the SCell of the terminal device and the related information, and the PUCCH resource may no longer be used to transmit the reporting message. If the second timer is started, when the terminal device uses the PUSCH resource to transmit the MAC CE or receives the DCI scheduling the PUSCH resource, since the second timer is used to control the maximum transmission time for transmitting the PUCCH resource, in this case, the second timer can be stopped.

In the embodiments of the present disclosure, the end time of the first time period or the third time period is a start point of a first symbol of the PUCCH resource.

In the embodiments of the present disclosure, the end time of the first time period or the third time period is the start point of the first symbol of the PUCCH resource. That there is the second PUSCH resource in the first time period before the current effective transmission time of the PUCCH resource is taken as an example for illustration, the first time period in the embodiments of the present disclosure may mean that there are all or part of the symbols of the PUSCH resource in the first time period.

In the embodiments of the present disclosure, the end time of the first time period or the third time period is the start point of the first symbol of the PUCCH resource, or may also be an end point of the last symbol of the PUCCH resource, or may also be a middle point of the middle symbol of the PUCCH resource, or may also be a start point, end point or middle point of another symbol, which is not specifically limited in the present disclosure.

In the embodiments of the present disclosure, the start time of the second time period or the fourth time period may be the start point of the first symbol or the end point of the last symbol of the PUCCH resource.

In the embodiments of the present disclosure, the start time of the second time period or the fourth time period may be the start point of the first symbol or the end point of the last symbol of the PUCCH resource. That there is the second PUSCH resource in the second time period after the current effective transmission time of the PUCCH resource is taken as an example for illustration, the second time period in the embodiments of the present disclosure may mean that there are all or part of the symbols of the second PUSCH resource in the second time period.

In the embodiments of the present disclosure, the start time of the second time period or the fourth time period may be the start point of the first symbol of the PUCCH resource, or may also be the end point of the last symbol of the PUCCH resource, or may also be the middle point of the middle symbol of the PUCCH resource, or may also be a start point, end point or middle point of another symbol, which is not specifically limited in the present disclosure.

The values of the durations of the first time period, the second time period, the third time period, and the fourth time period in the embodiments of the present disclosure may be determined by the protocol stipulation, or may be determined by the pre-configuration of the network device, or may be determined according to a reporting capability of the terminal device.

For example, if the value of the duration of the first time period is 2 ms as specified in the protocol or configured in the pre-configuration of the network device, it can be determined that the duration of the first time period is 2 ms; if the value of the duration of the third time period is 3 ms as specified in the protocol or configured in the pre-configuration of the network device, it can be determined that the duration of the third time period is 3 ms; alternatively, the value of the duration of the first time period or the third time period is determined according to the reporting capability of the terminal device. If the terminal device has a better reporting ability, the value of the duration of the first time period or the third time period can be set larger. If the terminal device has a poorer reporting ability, the value of the duration of the first time period or the third time period can be set smaller.

Optionally, in some embodiments, the configuration information includes a mandatory field to indicate the PUCCH resource.

In the embodiments of the present disclosure, one mandatory field may be used to indicate the PUCCH resource. Since the second configuration may include the PUCCH resource indication information, the terminal device can transmit the first reporting message to the network device through the PUCCH resource indicated by the PUCCH resource indication information, and the PUCCH resource may be indicated by one mandatory field. In this case, since the second configuration may include one mandatory field to indicate the PUCCH resource, it is possible to avoid backoff to use the RACH resource for transmission, thereby reducing the delay of the BFR procedure.

Optionally, in some embodiments, the MAC CE carries beam failure information of the SCell.

In the embodiments of the present disclosure, the MAC CE can carry the beam failure information of the SCell. The beam failure information can indicate a cell where the beam failure occurs, a beam on which the beam failure occurs, or a new beam. It can also indicate that there are no beams that meet a preset condition.

Optionally, in some embodiments, the configuration information indicates at least one of the following information: a period of transmitting the reporting message through the PUCCH resource, a time domain offset of each period of the PUCCH resource, a maximum transmission number of transmitting the reporting message through the PUCCH resource, a timer for a maximum transmission time of transmitting the reporting message through the PUCCH resource, a window time of the maximum transmission time of transmitting the reporting message through the PUCCH resource, a timer for an interval of transmitting the reporting message through the PUCCH resource, a cell corresponding to the PUCCH resource, a bandwidth part (BWP) corresponding to the PUCCH resource, and a PUCCH format corresponding to the PUCCH resource.

In the embodiments of the present disclosure, the first configuration received by the terminal device may indicate at least one of the foregoing information for configuring the PUCCH resource. For example, it may indicate: a period of transmitting the reporting message through the PUCCH resource, that is, a difference between the current effective transmission time of the PUCCH resource and the next effective transmission time of the PUCCH resource; the time domain offset of each period of the PUCCH resource; the maximum transmission number of transmitting the reporting message through the PUCCH resource, that is, the PUCCH resource can be transmitted periodically, but cannot exceed the maximum transmission number of transmitting the reporting message through the PUCCH resource.

The first configuration may also indicate the timer or the window time for controlling the maximum transmission time for transmitting the PUCCH resource, that is, the PUCCH resource can be used to transmit the reporting message multiple times within the maximum transmission time range configured by the timer or the window time. If the maximum transmission time configured by the timer or the window time is exceeded, and the terminal device has not received the scheduling information related to the PUSCH, or has not received the feedback information for the MAC CE, it can be considered that the BFR of the SCell fails.

The first configuration may also indicate the timer for controlling the transmission interval of the PUCCH resource, that is, the current effective transmission time of the PUCCH resource can be spaced apart from the initiation of the next effective transmission time of the PUCCH resource by a time period. Thu duration of this time period may be different values.

The first configuration may also indicate the BWP corresponding to the PUCCH resource. If the service volume of the terminal device is large, the BWP corresponding to the PUCCH resource indicated in the first configuration can be wider, for example, it can be 40 MHZ; if the service volume of the terminal device is small, the BWP corresponding to the PUCCH resource indicated in the first configuration can be smaller, for example, can be 10 MHZ.

It should be understood that the numerical values in the embodiments of the present disclosure are only examples, and may also be other numerical values, which should not specifically limit the present disclosure.

Optionally, in some embodiments, the cell that transmits the PUCCH resource may be the PCell, the SCell or the SCell that supports the PUCCH transmission of the terminal device.

In the embodiments of the present disclosure, since the corresponding PCell or PSCell is still in the normal state in the case where the beam failure occurs in the SCell of the terminal device, the cell transmitting the PUCCH resource may be the PCell or PSCell of the terminal device. In addition, the network device may configure the SCell that can support the PUCCH transmission for the terminal device, and in the case where the beam failure occurs in the SCell of the terminal device, the reporting message can be sent to the network device through the SCell that supports the PUCCH resource transmission.

Optionally, in some embodiments, the PUCCH format corresponding to the PUCCH resource is a format 0 or a format 1.

In the embodiments of the present disclosure, the format corresponding to the PUCCH resource may be the format 0 or the format 1. It will be appreciated that since the format corresponding to the PUCCH resource may include format 0, format 1, format 2, format 3, and format 4, lengths in the OFDM symbols are respectively 1-2, 4-14, 1-2, 4-14, 4-14. Among these 5 formats, bit numbers of the format 0 and the format 1 is less than or equal to 2, and bit numbers of the format 2, the format 3 and the format 4 are all greater than 2. Therefore, the PUCCH format corresponding to the PUCCH resource in the embodiments of the present disclosure may be the format 0 and the format 1, so that the number of transmitted bits is small during the transmission.

Optionally, in some embodiments, if the PUCCH format corresponding to the PUCCH resource is the format 0, a parameter in a cyclic factor of the PUCCH resource is a specific value.

Optionally, in some embodiments, if the PUCCH format corresponding to the PUCCH resource is the format 1, a bit value of the reporting message transmitted on the PUCCH resource is a specific value.

In the embodiments of the present disclosure, if the format corresponding to the PUCCH resource is the format 0, the parameter in the cyclic factor of the PUCCH resource may be the specific value. It will be appreciated that the PUCCH resource corresponds to a sequence, and different sequences can transmit different information. By changing the value of the cyclic factor, the PUCCH resource can be used to transmit different information.

In the embodiments of the present disclosure, if the format corresponding to the PUCCH resource is the format 1, the bit value of the reporting message transmitted on the PUCCH resource may be the specific value, for example, it may be 00, 01, 10, 11, etc.

Optionally, in some embodiments, the specific value is stipulated by a protocol or configured by the network device.

In the embodiments of the present disclosure, the value of the parameter of the cyclic factor of the PUCCH resource or the bit value of the reporting message transmitted on the PUCCH resource may be specified by the protocol or configured by the network device. For example, in an implementation, the protocol can stipulates that the value of the parameter of the cyclic factor of the PUCCH resource may be 0, or the bit value of the reporting message transmitted on the PUCCH resource may be 00.

In another implementation, the network device may configure the parameter of the cyclic factor of the PUCCH resource to 0, or configure the bit value of the reporting message transmitted on the PUCCH resource to be 01.

It should be understood that the above-mentioned numerical values are merely illustrative, and may also be other numerical values, which are not specifically limited in the present disclosure.

Optionally, in some embodiments, the priority order of transmitting the information or the data may be:

d1: a priority of transmitting the MAC CE is higher than a priority of transmitting any logical channel.

d2: the priority of transmitting the MAC CE is higher than a priority of transmitting C-RNTI information or data from UL-CCCH.

d3: the priority of transmitting the MAC CE is lower than the priority of transmitting the C-RNTI information or the data from the UL-CCCH and higher than a priority of transmitting configured grant confirmation information.

d4: the priority of transmitting the MAC CE is the same as the priority of transmitting the C-RNTI information or the data from the UL-CCCH.

d5: the priority of transmitting the MAC CE is the same as the priority of transmitting the configured grant confirmation information.

d6: the priority of transmitting the MAC CE is lower than the priority of transmitting the configured grant confirmation information and higher than a priority of transmitting BSR information.

d7: the priority of transmitting the MAC CE is the same as the priority of transmitting the BSR information.

d8: the priority of transmitting the MAC CE is lower than the priority of transmitting the BSR information and higher than a priority of transmitting a single piece of PHR information or multiple pieces of PHR information.

The priority of transmitting the data or the information based on the rules of d1-d8 is similar to the process of rules a1-a8, and reference may be made to the above-mentioned process. For the sake of brevity, it will not be repeated here.

Optionally, in some embodiments, in response to a transmission number of the reporting message, by the terminal device, through the PUCCH resource is greater than or equal to a maximum transmission number of transmitting the reporting message through the PUCCH resource, the terminal device confirms that the BFR of the SCell fails; or in response to that a second timer used to control the maximum transmission time for transmitting the PUCCH resource expires, the terminal device confirms that the BFR of the SCell fails; or the MAC CE is not transmitted to the network device through the PUSCH resource by the terminal device or the DCI for scheduling the PUSCH resource is not received by the terminal device within a first window time, the terminal device confirms that the BFR of the SCell fails; or in a case where the MAC CE is transmitted to the network device by the terminal device and the feedback information or the response message for the MAC CE is not received by the terminal device, the terminal device confirms that the BFR of the SCell fails.

In an implementation, if the number of using the PUCCH resource to report the message by the terminal device is greater than or equal to the maximum transmission number of transmitting the reporting message through the PUCCH resource, the terminal device confirms that the BFR of the SCell fails. For example, if the maximum transmission number of transmitting the reporting message through the PUCCH resource is 10, after the terminal device uses the PUCCH resource to transmit the reporting message to request the resource for the 10th time, but the request is not successful, and when the terminal device uses the PUCCH resource to transmit the reporting message again, it can be confirmed that the BFR of the SCell of the terminal device fails in this case, since the maximum transmission number of transmitting the reporting message through the PUCCH resource has been exceeded.

Optionally, the transmission number of transmitting the reporting message through the PUCCH resource mentioned in the embodiments of the present disclosure may be a transmission number of actually transmitting the reporting message through the PUCCH resource, or may be a sum of the transmission number of actually transmitting the reporting message through the PUCCH resource and the number of actually not transmitting the reporting message with a transmission opportunity.

As pointed out above, if transmitting the reporting message through the PUCCH resource overlaps with the measurement gap, the terminal device can cancel or stop the transmission of the reporting message at the current effective transmission time of the PUCCH resource, or if transmitting the reporting message through the PUCCH resource overlaps with the transmission of the PUCCH resource, the terminal device cancels or stops the transmission of the reporting message at the current effective transmission time of the PUCCH resource. Therefore, in these two cases, the terminal device can transmit the reporting message through the PUCCH resource, but ultimately does not use the current effective transmission time of the PUCCH resource to transmit the reporting message.

For example, if the maximum transmission number of transmitting the reporting message through the PUCCH resource is 10, the number of actually transmitting the reporting message through the PUCCH resource is 5, the number of actually not transmitting the reporting message with the transmission opportunity is 6. In an embodiment, the transmission of the reporting message may be continued; in another embodiment, the sum of the number of actually transmitting the reporting message through the PUCCH resource and the number of actually not transmitting the reporting message with the transmission opportunity is greater than the maximum transmission number of transmitting the reporting message through the PUCCH resource, it can be confirmed that the BFR of the SCell of the terminal device fails.

In another implementation, in response to that a second timer used to control the maximum transmission time for transmitting the PUCCH resource expires, the terminal device confirms that the BFR of the SCell fails.

In the embodiments of the present disclosure, the second timer may be used to control the maximum transmission time for transmitting the PUCCH resource. For example, assuming the maximum transmission time of transmitting the reporting message through the PUCCH resource is 10 ms, if the terminal device transmits the reporting message to the network device through the PUCCH resource within 10 m and does not receive the feedback information or the response information for the reporting message, it can be confirmed that the BFR of the SCell fails.

In another implementation, for example, assuming the maximum transmission time of transmitting the MAC CE through the PUSCH resource is 10 ms, if the MAC CE is not transmitted through the PUSCH resource or the DCI for scheduling the PUSCH resource is not received within 10 ms, it can be confirmed that the BFR of the SCell fails. It should be understood that, in the embodiments of the present disclosure, the MAC CE being not transmitted through the PUSCH resource may mean that the terminal device transmits the MAC CE to the network device and does not receive the feedback information for the MAC CE, or the terminal device does not transmit the MAC CE to the network through the PUSCH.

In another implementation, if the terminal device transmits the MAC CE to the network device and does not receive the feedback information or the response message for the MAC CE, it is confirmed that the BFR of the SCell fails.

In the embodiments of the present disclosure, the terminal device can transmit the MAC CE to the network device through the PUSCH resource. After receiving the MAC CE, the network device can transmit the feedback information or the response message for the MAC CE to the terminal device. If the terminal device does not receive the feedback information or the response message, the terminal device can confirm that the BFR of the SCell fails.

Optionally, in some embodiments, if the terminal device transmits the MAC CE to the network device and receives the feedback information or the response message for the MAC CE, it is confirmed that the BFR of the SCell is successful.

In the embodiments of the present disclosure, the terminal device can transmit the MAC CE to the network device through the PUSCH resource. After receiving the MAC CE, the network device can transmit the feedback information for the MAC CE to the terminal device. After receiving the feedback information or the response message for the MAC CE, the terminal device can confirm that the BFR of the SCell is successful.

Optionally, in some embodiments, when the BFR timer of the SCell ends, in a case where the terminal device transmits the MAC CE to the network device and does not receive the feedback information or the response message for the MAC CE, it is confirmed that the BFR of the SCell fails.

Optionally, in some embodiments, before the BFR timer of the SCell ends, in a case where the terminal device transmits the MAC CE to the network device and receives the feedback information or the response message for the MAC CE, it is confirmed that the BFR of the SCell is successful.

In the embodiments of the present disclosure, the BFR timer can monitor the time of the entire BFR procedure. If the terminal device still has not received the feedback information or the response message for MAC CE from a time when the terminal device transmits the reporting message to the network device through the PUCCH resource or transmits the MAC CE through the PUSCH resource to a time when the BFR timer ends, it can be confirmed that the BFR of the SCell of the terminal device fails; if the terminal device has received the feedback information or the response message for the beam failure information of the SCell before the BFR timer of the SCell ends, it can be confirmed that the BFR of the SCell of the terminal device succeeds.

The timer in the embodiments of the present disclosure can better control the duration of the BFR. It will be appreciated that if no BFR timer is configured during the BFR procedure, there is no duration constraint, the terminal device will receive the beam failure information of the SCell until a long time passed. In this case, it can be considered that the BFR of the SCell of the terminal device succeeds.

Optionally, in some embodiments, in response to the success of the BFR of the SCell, the BFR timer of the SCell is stopped.

Optionally, in some embodiments, in response to the success of the BFR of the SCell, the counter used to determine the occurrence of the beam failure of the SCell is reset to 0.

In the embodiments of the present disclosure, when the terminal device confirms that the BFR of its SCell succeeds, the BFR timer of the SCell can be stopped. It will be appreciated that the BFR timer of the SCell is used to monitor the duration of the BFR of the SCell, that is, to determine whether the BFR of the SCell is successful within a certain duration. Therefore, when the terminal device confirms that the BFR of its SCell succeeds, it can stop the BFR timer of the SCell in response to the success of the BFR of the SCell.

The counter in the embodiments of the present disclosure is used to determine the occurrence of the beam failure of the SCell, that is, within a certain period of time, if the number of BFIs counted by the counter is within a certain value, it can be considered that the beam failure does not occur in the SCell of the terminal device. Therefore, when the terminal device confirms that the BFR of its SCell succeeds, it can reset the counter used to determine the occurrence of beam failure of the SCell to 0 in response to the success of the BFR of the SCell.

Optionally, in some embodiments, the timer is configured by the network device for the terminal device.

Optionally, in some embodiments, the timer is configured by the network device for the terminal device through the RRC signaling.

In the embodiments of the present disclosure, the BFR timer of the SCell may be configured by the network device for the terminal device. Further, the BFR timer of the SCell may be configured by the network device for the terminal device through the RRC signaling. A duration of the configured BFR timer may also be determined by the network device, for example, it may be 100 ms or 1 s, which is not specifically limited in the present disclosure.

Optionally, in some embodiments, a time for starting or restarting the timer of the BFR is one of the following times: when detecting that the beam failure occurs in the secondary cell by the terminal device; after detecting that the beam failure occurs in the secondary cell by the terminal device; when transmitting the reporting message through the PUCCH resource; before transmitting the reporting message through the PUCCH resource; after transmitting the reporting message through the PUCCH resource; when transmitting the MAC CE of the secondary cell; before transmitting the MAC CE of the secondary cell; and after transmitting the MAC CE of the secondary cell.

In the embodiments of the present disclosure, the description takes when or after the terminal device detecting that the beam failure occurs in the SCell as an example. When the terminal device detects that the beam failure occurs in the SCell, then the BFR timer can be started. Alternatively, after the terminal device detects that the beam failure occurs in the SCell, then the BFR timer can be started. As for how long the terminal device starts the BFR timer after detecting the beam failure occurs in the SCell, it can be determined by the terminal device. For example, the terminal device can start the BFR timer after 2 ms since the beam failure occurring in the SCell is detected.

The numerical values in the embodiments of the present disclosure are merely examples, and may also be other numerical values, which are not specifically limited in the present disclosure.

Similarly, the process of starting or restarting the BFR timer in other cases will not be repeated here.

Therefore, according to the wireless communication method of the embodiments of the present disclosure, the network device can transmit the configuration information to the terminal device. The configuration information can be used to configure the PUCCH resource. After receiving the configuration information, the terminal device can transmit the reporting message through the PUCCH resource, or transmit the MAC CE through the PUSCH resource. Further, when the PUCCH resource used by the terminal device to transmit the reporting message to the network device overlaps with another resource, for example, the first PUSCH resource, the terminal device may transmit the MAC CE through the first PUSCH resource, which can reduce unnecessary transmission of the PUCCH resource, which can reduce the delay of the BFR procedure.

The method embodiments of the present disclosure are described in detail above with reference to FIGS. 2 to 4, and device embodiments of the present disclosure are described in detail below in conjunction with FIGS. 5 to 11. It should be understood that the device embodiments and the method embodiments correspond to each other and similar description can refer to the method embodiments.

Figure 5:
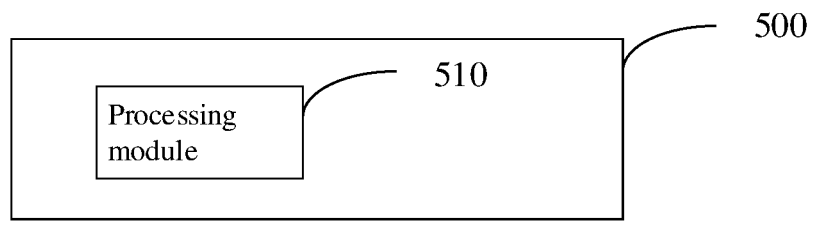
FIG. 5 is a schematic block diagram of a terminal device provided by an embodiment of the present disclosure.

FIG. 5 shows a schematic block diagram of a terminal device 500 according to some embodiments of the present disclosure.

As shown in FIG. 5, the terminal device 500 includes: a processing module 510, configured to generate a request message in response to a beam failure occurred in a secondary cell; and the request message corresponds to a first configuration or a second configuration, the first configuration is a configuration of a scheduling request associated with at least one logical channel, and the second configuration is a configuration of a scheduling request not associated with a logical channel.

Optionally, in some embodiments, the request message is used to request an uplink transmission resource from a network device and/or notify the network device that the beam failure occurs in the secondary cell.

Optionally, in some embodiments, in response to the configuration corresponding to the request message being the first configuration, the first configuration is determined from a configuration set based on at least one of the following: indication information of the network device, a scheduling request identifier corresponding to each configuration in the configuration set, a resource identifier corresponding to each configuration in the configuration set, and a priority order of logical channels corresponding to respective configurations in the configuration set; or, the first configuration is randomly selected from the configuration set; and, the configuration set includes a configuration of at least one scheduling request, and each scheduling request corresponds to the at least one logical channel.

Optionally, in some embodiments, the indication information of the network device is indicated by configuration information corresponding to a beam failure recovery (BFR).

Optionally, in some embodiments, the first configuration is a configuration in the configuration set that satisfies the following condition: a corresponding scheduling request identifier of the configuration is the largest or the smallest, or a resource identifier corresponding to a corresponding scheduling request of the configuration is the largest or smallest.

Optionally, in some embodiments, the first configuration is a configuration in the configuration set that satisfies the following condition: a priority of a logical channel associated with a scheduling request corresponding to the configuration is the highest or the lowest.

Optionally, in some embodiments, a scheduling request identifier of the second configuration is different from a scheduling request identifier corresponding to the configuration of the scheduling request associated with the logical channel; and/or, a scheduling request resource identifier corresponding to the second configuration is different from a scheduling request resource identifier corresponding to the configuration of the scheduling request associated with the logical channel.

Optionally, in some embodiments, a parameter type of the second configuration is the same as part or all of parameter types of the configuration of the scheduling request of the logical channel.

Optionally, in some embodiments, a value of the scheduling request identifier of the second configuration is an integer greater than or equal to 8.

Optionally, in some embodiments, a value of the scheduling request resource identifier of the second configuration is an integer greater than or equal to 9 or equal to 0.

Optionally, in some embodiments, the second configuration indicates a physical uplink control channel (PUCCH) resource.

Optionally, in some embodiments, signaling corresponding to the second configuration includes a mandatory field to indicate the PUCCH resource.

Optionally, in some embodiments, a PUCCH format corresponding to the PUCCH resource is PUCCH format 0 or PUCCH format 1.

Optionally, in some embodiments, the second configuration is indicated by a configuration message corresponding to the BFR.

Optionally, in some embodiments, a priority of transmitting beam failure information of the secondary cell is higher than a priority of transmitting any logical channel; or the priority of transmitting the beam failure information of the secondary cell is higher than a priority of transmitting cell-radio network temporary identifier (C-RNTI) information or data from an uplink common control channel (UL-CCCH); or the priority of transmitting the beam failure information of the secondary cell is lower than the priority of transmitting the C-RNTI information or the data from the UL-CCCH and higher than a priority of transmitting configured grant confirmation information; or the priority of transmitting the beam failure information of the secondary cell is the same as the priority of transmitting the C-RNTI information or the data from the UL-CCCH; or the priority of transmitting the beam failure information of the secondary cell is the same as the priority of transmitting the configured grant confirmation information; or the priority of transmitting the beam failure information of the secondary cell is lower than the priority of transmitting the configured grant confirmation information and higher than a priority of transmitting buffer status report (BSR) information; or the priority of transmitting the beam failure information of the secondary cell is the same as the priority of transmitting the BSR information; or the priority of transmitting the beam failure information of the secondary cell is lower than the priority of transmitting the BSR information and higher than a priority of transmitting a single piece of power headroom report (PHR) information or multiple pieces of PHR information.

Optionally, in some embodiments, the request message is transmitted on a special cell of the terminal device, and the special cell of the terminal device includes a primary cell or a primary secondary cell.

Optionally, in some embodiments, the terminal device further includes: a communication module, configured to transmit the beam failure information of the secondary cell to the network device.

Optionally, in some embodiments, the beam failure information of the secondary cell is transmitted on the special cell of the terminal device, and the special cell of the terminal device includes the primary cell or the primary secondary cell of the terminal device.

Optionally, in some embodiments, the beam failure information of the secondary cell is transmitted through a medium access control (MAC) control element (CE).

Optionally, in some embodiments, the beam failure information is carried on a first resource, and the first resource is a resource indicated by a response message for the request message.

Optionally, in some embodiments, the processing module 510 is further configured to: in a case where a transmission number of the request message is greater than or equal to a maximum transmission number indicated by the configuration of the request message, confirm that the BFR of the secondary cell fails; or in response to the beam failure information of the secondary cell being transmitted to the network device and no feedback information or no response message for the beam failure information of the secondary cell having been received, confirm that the BFR of the secondary cell fails.

Optionally, in some embodiments, the terminal device further includes: the communication module, configured to transmit the beam failure information of the secondary cell to the network device; and the processing module 510 is further configured to: when a timer of the BFR of the secondary cell ends, confirm that the BFR of the secondary cell fails in response to no feedback information or no response message for the beam failure information of the secondary cell being received.

Optionally, in some embodiments, the processing module 510 is further configured to: deactivate the secondary cell.

Optionally, in some embodiments, the terminal device further includes: the communication module, configured to transmit the beam failure information of the secondary cell to the network device; and the processing module 510 is further configured to confirm that the BFR of the secondary cell is successful in response to the feedback information or the response message for the beam failure information of the secondary cell being received.

Optionally, in some embodiments, the processing module 510 is further configured to: before the timer of the BFR of the secondary cell ends, confirm that the BFR of the secondary cell is successful in response to the feedback information or the response message for the beam failure information of the secondary cell being received.

Optionally, in some embodiments, the processing module 510 is further configured to: in response to that the BFR of the secondary cell is successful, stopping the timer corresponding to the BFR of the secondary cell.

Optionally, in some embodiments, the processing module 510 is further configured to: in response to that the BFR of the secondary cell is successful, resetting a counter used to determine occurrence of the beam failure in the secondary cell to 0.

Optionally, in some embodiments, the timer is configured by the network device for the terminal device.

Optionally, in some embodiments, the timer is configured by the network device for the terminal device through radio resource control (RRC) signaling.

Optionally, in some embodiments, a time for starting or restarting the timer is one of the following times: when detecting that the beam failure occurs in the secondary cell by the terminal device; after detecting that the beam failure occurs in the secondary cell by the terminal device; when generating the request message; before generating the request message; after generating the request message; when transmitting the request message; before transmitting the request message; after transmitting the request message; when transmitting the beam failure information of the secondary cell; before transmitting the beam failure information of the secondary cell; and after transmitting the beam failure information of the secondary cell.

Figure 6:
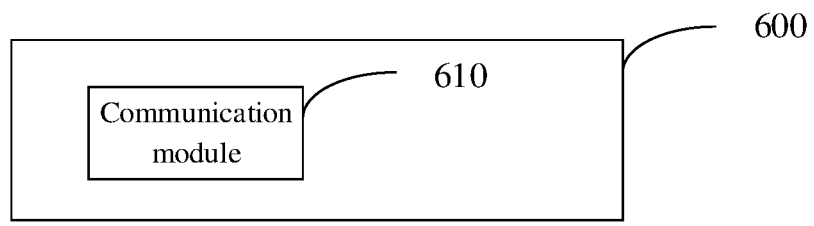
FIG. 6 is a schematic block diagram of a terminal device provided by another embodiment of the present disclosure.

FIG. 6 shows a schematic block diagram of a terminal device 600 according to another embodiment of the present disclosure.

As shown in FIG. 6, the terminal device 600 includes: a communication module 610, configured to receive configuration information, and the configuration information is used to configure a physical uplink control channel (PUCCH) resource; and the communication module 610 is further configured to: in response to a beam failure occurred in a secondary cell, transmit a reporting message through the PUCCH resource and/or transmit a media access control (MAC) control element (CE) through a physical uplink shared channel (PUSCH) resource.

Optionally, in some embodiments, the terminal device further includes: a processing module, configured to cancel or stop transmission of the reporting message at a current effective transmission time of the PUCCH resource in response to one or more of the following conditions being satisfied: a first timer corresponding to the PUCCH resource is running at the current effective transmission time of the PUCCH resource, and the first timer is used to control a transmission interval of the PUCCH resource; the current effective transmission time of the PUCCH resource overlaps with a first PUSCH resource included in the PUSCH resource; a second PUSCH resource included in the PUSCH resource exists in a first time period or a second time period, an end time of the first time period is earlier than the current effective transmission time or is a time within the current effective transmission time, and a start time of the second time period is later than the current effective transmission time or is a time within the current effective transmission time; downlink control information (DCI) for scheduling a third PUSCH resource included in the PUSCH resource exists in a third time period or a fourth time period, an end time of the third time period is earlier than the current effective transmission time or is a time within the current effective transmission time, and a start time of the fourth time period is later than the current effective transmission time or is a time within the current effective transmission time; the current effective transmission time of the PUCCH resource overlaps with a measurement gap; a second timer corresponding to the PUCCH resource stops or expires at the current effective transmission time of the PUCCH resource, and the second timer is used to control a maximum transmission time for transmitting the PUCCH resource; the current effective transmission time of the PUCCH resource overlaps with a transmission resource carrying hybrid automatic repeat request (HARM) information, and the transmission resource corresponds to a time domain resource used for transmission; the current effective transmission time of the PUCCH resource overlaps with a transmission resource corresponding to the scheduling request, and the transmission resource corresponds to the time domain resource used for transmission; before the current effective transmission time of the PUCCH resource, DCI for scheduling a fourth PUSCH resource included in the PUSCH resource is received by the terminal device; before the current effective transmission time of the PUCCH resource, the MAC CE is transmitted by the terminal device through the PUSCH resource or the MAC CE is successfully transmitted by the terminal device through the PUSCH resource.

Optionally, in some embodiments, in response to one or more of the following conditions being satisfied, the reporting message is transmitted at the current effective transmission time of the PUCCH resource: a first timer corresponding to the PUCCH resource stops or expires at the current effective transmission time of the PUCCH resource, and the first timer is used to control a transmission interval of the PUCCH resource; the current effective transmission time of the PUCCH resource does not overlap with the PUSCH resource; the current effective transmission time of the PUCCH resource does not overlap with a measurement gap; a second timer corresponding to the PUCCH resource is running at the current effective transmission time of the PUCCH resource, and the second timer is used to control a maximum transmission time for transmitting the PUCCH resource; the current effective transmission time of the PUCCH resource does not overlap with a transmission resource carrying HARQ information, and the transmission resource corresponds to a time domain resource used for transmission; the current effective transmission time of the PUCCH resource does not overlap with a transmission resource corresponding to the scheduling request, and the transmission resource corresponds to the time domain resource used for transmission; before the current effective transmission time of the PUCCH resource, DCI for scheduling the PUSCH resource is not received by the terminal device; DCI for scheduling the PUSCH resource is not received in a third time period or a fourth time period, an end time of the third time period is earlier than the current effective transmission time or is a time within the current effective transmission time, and a start time of the fourth time period is later than the current effective transmission time or is a time within the current effective transmission time; before the current effective transmission time of the PUCCH resource, the MAC CE is not transmitted by the terminal device through the PUSCH resource; and before the current effective transmission time of the PUCCH resource, transmission of the MAC CE through the PUSCH resource by the terminal device fails.

Optionally, in some embodiments, the PUSCH resource includes the fourth PUSCH resource, and the fourth PUSCH resource is a resource indicated by a response message for the reporting message.

Optionally, in some embodiments, the PUSCH resource includes a first PUSCH resource, and the first PUSCH resource overlaps with a current effective transmission time of the PUCCH resource; and/or the PUSCH resource includes a second PUSCH resource, the second PUSCH resource is located in a first time period or a second time period in a time domain, an end time of the first time period is earlier than the current effective transmission time or is a time within the current effective transmission time, and a start time of the second time period is later than the current effective transmission time or is a time within the current effective transmission time; and/or the PUSCH resource includes a third PUSCH resource, DCI for scheduling the third PUSCH resource is located in a third time period or a fourth time period in the time domain, an end time of the third time period is earlier than the current effective transmission time or is a time within the current effective transmission time, and a start time of the fourth time period is later than the current effective transmission time or is a time within the current effective transmission time; and/or the PUSCH resource includes a fifth PUSCH resource, and the fifth PUSCH resource is scheduled by configured grant type 1 or configured grant type 2.

Optionally, in some embodiments, the terminal device further includes: the processing module configured to: in response to successfully transmitting the MAC CE by the terminal device through the PUSCH resource, no longer transmit the reporting message through the PUCCH resource.

Optionally, in some embodiments, the terminal device further includes: the processing module configured to: stop the second timer, in response to the terminal device transmitting the MAC CE through the PUSCH resource or receiving the DCI for scheduling the PUSCH resource, and the second timer is used to control the maximum transmission time for transmitting the PUCCH resource.

Optionally, in some embodiments, the end time of the first time period or the third time period is a start point of a first symbol of the PUCCH resource.

Optionally, in some embodiments, a value of a duration of the first time period or the third time period is determined according to at least one of the following situations: a protocol stipulation, a pre-configuration of the network device and a reporting capability of the terminal device.

Optionally, in some embodiments, the start time of the second time period or the fourth time period is an end point of a last symbol or the start point of the first symbol of the PUCCH resource.

Optionally, in some embodiments, a value of a duration of the second time period or the fourth time period is determined according to at least one of the following situations: the protocol stipulation, the pre-configuration of the network device and the reporting capability of the terminal device.

Optionally, in some embodiments, configuration information includes a mandatory field to indicate the PUCCH resource.

Optionally, in some embodiments, the MAC CE carries beam failure information of the secondary cell.

Optionally, in some embodiments, the configuration information indicates at least one of the following information: a period of transmitting the reporting message through the PUCCH resource, a time domain offset of each period of the PUCCH resource, a maximum transmission number of transmitting the reporting message through the PUCCH resource, a timer for a maximum transmission time of transmitting the reporting message through the PUCCH resource, a window time of the maximum transmission time of transmitting the reporting message through the PUCCH resource, a timer for an interval of transmitting the reporting message through the PUCCH resource, a cell corresponding to the PUCCH resource, a bandwidth part (BWP) corresponding to the PUCCH resource, and a PUCCH format corresponding to the PUCCH resource.

Optionally, in some embodiments, the cell corresponding to the PUCCH resource is a primary cell, a primary secondary cell or a secondary cell supporting PUCCH transmission of the terminal device.

Optionally, in some embodiments, the PUCCH format corresponding to the PUCCH resource is PUCCH format 0 or PUCCH format 1.

Optionally, in some embodiments, if the PUCCH format corresponding to the PUCCH resource is PUCCH format 0, a parameter in a cyclic factor of the PUCCH resource is a specific value.

Optionally, in some embodiments, the specific value is stipulated by a protocol or configured by the network device.

Optionally, in some embodiments, if the PUCCH format corresponding to the PUCCH resource is PUCCH format 1, a bit value of the reporting message transmitted on the PUCCH resource is a specific value.

Optionally, in some embodiments, the specific value is stipulated by a protocol or configured by the network device.

Optionally, in some embodiments, a priority of transmitting the MAC CE is higher than a priority of transmitting any logical channel; the priority of transmitting the MAC CE is higher than a priority of transmitting cell-radio network temporary identifier (C-RNTI) information or data from an uplink common control channel (UL-CCCH); or the priority of transmitting the MAC CE is lower than the priority of transmitting the cell-radio network temporary identifier (C-RNTI) information or the data from the UL-CCCH and higher than a priority of transmitting configured grant confirmation information; or the priority of transmitting the MAC CE is the same as the priority of transmitting the cell-radio network temporary identifier (C-RNTI) information or the data from the UL-CCCH; or the priority of transmitting the MAC CE is the same as the priority of transmitting the configured grant confirmation information; or the priority of transmitting the MAC CE is lower than the priority of transmitting the configured grant confirmation information and higher than a priority of transmitting buffer status report (BSR) information; or the priority of transmitting the MAC CE is the same as the priority of transmitting the BSR information; or the priority of transmitting the MAC CE is lower than the priority of transmitting the BSR information and higher than a priority of transmitting a single piece of power headroom report (PHR) information or multiple pieces of PHR information.

Optionally, in some embodiments, the terminal device further includes: a processing module, configured to: in response to a transmission number of the reporting message, by the terminal device, through the PUCCH resource is greater than or equal to a maximum transmission number of transmitting the reporting message through the PUCCH resource, confirm that beam failure recovery (BFR) of the secondary cell fails; or in response to that a second timer used to control the maximum transmission time for transmitting the PUCCH resource expires, confirm that the BFR of the secondary cell fails; or if the MAC CE is not transmitted to the network device through the PUSCH resource by the terminal device or the DCI for scheduling the PUSCH resource is not received by the terminal device within a first window time, confirm that the BFR of the secondary cell fails; or in response to the terminal device having transmitted the MAC CE to the network device and having not received a feedback information or a response message for the MAC CE, confirm that the BFR of the secondary cell fails.

Optionally, in some embodiments, the number of transmitting the reporting message by the terminal device through the PUCCH resource is a transmission number of actually transmitting the reporting message through the PUCCH resource; or the number of transmitting the reporting message by the terminal device through the PUCCH resource is a sum of the transmission number of actually transmitting the reporting message through the PUCCH resource and the number of times that the PUCCH resource has a transmission opportunity but does not transmit the reporting message.

Optionally, in some embodiments, the processing module is further configured to: when a timer corresponding to the BFR of the secondary cell ends, confirm that the BFR of the secondary cell fails in response to the terminal device having transmitted the MAC CE to the network device and having not received the feedback information or the response message for the MAC CE.

Optionally, in some embodiments, the terminal device further includes: a processing module, configured to: in response to the terminal device having transmitted the MAC CE to the network device and having received the feedback information or the response message for the MAC CE, confirm that the BFR of the secondary cell is successful.

Optionally, in some embodiments, the processing module is further configured to: before the timer of the BFR of the secondary cell ends, confirm that the BFR of the secondary cell is successful in response to the terminal device having transmitted the MAC CE to the network device and having received the feedback information or the response message for the MAC CE.

Optionally, in some embodiments, the processing module is further configured to: in response to that the BFR of the secondary cell is successful, stop the timer corresponding to the BFR of the secondary cell.

Optionally, in some embodiments, the processing module is further configured to: in response to that the BFR of the secondary cell is successful, reset a counter used to determine occurrence of the beam failure in the secondary cell to 0.

Optionally, in some embodiments, the timer is configured by the network device for the terminal device.

Optionally, in some embodiments, the timer is configured by the network device for the terminal device through radio resource control (RRC) signaling.

Optionally, in some embodiments, a time for starting or restarting the timer of the BFR is one of the following times: when detecting that the beam failure occurs in the secondary cell by the terminal device; after detecting that the beam failure occurs in the secondary cell by the terminal device; when transmitting the reporting message through the PUCCH resource; before transmitting the reporting message through the PUCCH resource; after transmitting the reporting message through the PUCCH resource; when transmitting the MAC CE of the secondary cell; before transmitting the MAC CE of the secondary cell; and after transmitting the MAC CE of the secondary cell.

Figure 7:
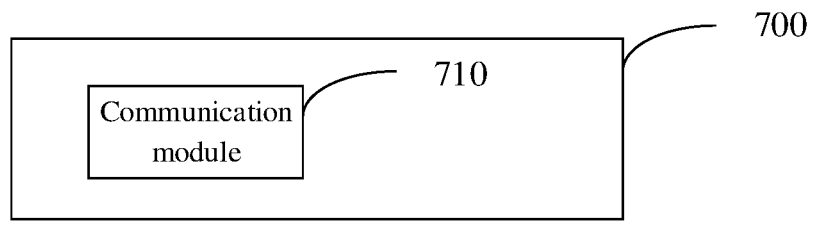
FIG. 7 is a schematic block diagram of a network device provided by an embodiment of the present disclosure.

FIG. 7 shows a schematic block diagram of a network device 700 according to some embodiments of the present disclosure.

As shown in FIG. 7, the network device 700 includes: a communication module 710, configured to receive a request message transmitted from a terminal device in response to a beam failure occurred in a secondary cell; and the request message corresponds to a first configuration or a second configuration, the first configuration is a configuration of a scheduling request associated with at least one logical channel, and the second configuration is a configuration of a scheduling request not associated with a logical channel.

Optionally, in some embodiments, the request message is used to request an uplink transmission resource from the network device and/or notify the network device that the beam failure occurs in the secondary cell.

Optionally, in some embodiments, a scheduling request identifier of the second configuration is different from a scheduling request identifier corresponding to the configuration of the scheduling request associated with the logical channel; and/or, a scheduling request resource identifier corresponding to the second configuration is different from a scheduling request resource identifier corresponding to the configuration of the scheduling request associated with the logical channel.

Optionally, in some embodiments, a parameter type of the second configuration is the same as part or all of parameter types of the configuration of the scheduling request of the logical channel.

Optionally, in some embodiments, a value of the scheduling request identifier of the second configuration is an integer greater than or equal to 8.

Optionally, in some embodiments, a value of the scheduling request resource identifier of the second configuration is an integer greater than or equal to 9 or equal to 0.

Optionally, in some embodiments, the second configuration indicates a physical uplink control channel (PUCCH) resource.

Optionally, in some embodiments, signaling corresponding to the second configuration includes a mandatory field to indicate the PUCCH resource.

Optionally, in some embodiments, a PUCCH format corresponding to the PUCCH resource is PUCCH format 0 or PUCCH format 1.

Optionally, in some embodiments, the second configuration is indicated by a beam failure recovery (BFR) configuration message.

Optionally, in some embodiments, the request message is transmitted on a special cell of the terminal device, and the special cell of the terminal device includes a primary cell or a primary secondary cell.

Optionally, in some embodiments, the communication module 710 is further configured to receive beam failure information of the secondary cell.

Optionally, in some embodiments, the beam failure information of the secondary cell is transmitted on the special cell of the terminal device, and the special cell of the terminal device includes the primary cell or the primary secondary cell of the terminal device.

Optionally, in some embodiments, the beam failure information of the secondary cell is transmitted through a medium access control (MAC) control element (CE).

Optionally, in some embodiments, the beam failure information is carried on a first resource, and the first resource is a resource indicated by a response message for the request message.

Figure 8:
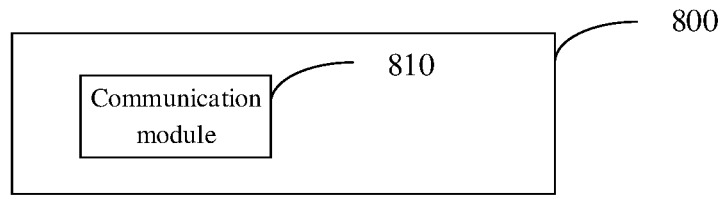
FIG. 8 is a schematic block diagram of a network device provided by another embodiment of the present disclosure.

FIG. 8 shows a schematic block diagram of a network device 800 according to another embodiment of the present disclosure.

As shown in FIG. 8, the network device 800 includes: a communication module 810, configured to transmit configuration information to a terminal device, and the configuration information is used to configure a physical uplink control channel (PUCCH) resource; and the communication module 810 is further configured to receive a reporting message transmitted by the terminal device through the PUCCH resource and/or a media access control (MAC) control element (CE) transmitted by the terminal device through a physical uplink shared channel (PUSCH) resource, in response to a beam failure occurred in a secondary cell.

Optionally, in some embodiments, the network device further includes: a processing module, configured to cancel or stop reception of the reporting message transmitted by the terminal device at a current effective transmission time of the PUCCH resource in response to one or more of the following conditions being satisfied: a first timer corresponding to the PUCCH resource is running at the current effective transmission time of the PUCCH resource, and the first timer is used to control a transmission interval of the PUCCH resource; the current effective transmission time of the PUCCH resource overlaps with a first PUSCH resource included in the PUSCH resource; a second PUSCH resource included in the PUSCH resource exists in a first time period or a second time period, an end time of the first time period is earlier than the current effective transmission time or is a time within the current effective transmission time, and a start time of the second time period is later than the current effective transmission time or is a time within the current effective transmission time; downlink control information (DCI) for scheduling a third PUSCH resource included in the PUSCH resource exists in a third time period or a fourth time period, an end time of the third time period is earlier than the current effective transmission time or is a time within the current effective transmission time, and a start time of the fourth time period is later than the current effective transmission time or is a time within the current effective transmission time; the current effective transmission time of the PUCCH resource overlaps with a measurement gap; a second timer corresponding to the PUCCH resource stops or expires at the current effective transmission time of the PUCCH resource, and the second timer is used to control a maximum transmission time for transmitting the PUCCH resource; the current effective transmission time of the PUCCH resource overlaps with a transmission resource carrying hybrid automatic repeat request (HARQ) information, and the transmission resource corresponds to a time domain resource used for transmission; the current effective transmission time of the PUCCH resource overlaps with a transmission resource corresponding to the scheduling request, and the transmission resource corresponds to the time domain resource used for transmission; before current effective transmission time of the PUCCH resource, DCI for scheduling a fourth PUSCH resource included in the PUSCH resource is transmitted to the terminal device by the network device; before the current effective transmission time of the PUCCH resource, the MAC CE transmitted by the terminal device through the PUSCH is received by the network device.

Optionally, in some embodiments, the communication module 810 is further configured to: in response to one or more of the following conditions being satisfied, receive the reporting message transmitted by the terminal device at the current effective transmission time of the PUCCH resource: a first timer corresponding to the PUCCH resource stops or expires at the current effective transmission time of the PUCCH resource, and the first timer is used to control a transmission interval of the PUCCH resource; the current effective transmission time of the PUCCH resource does not overlap with the PUSCH resource; the current effective transmission time of the PUCCH resource does not overlap with a measurement gap; a second timer corresponding to the PUCCH resource is running at the current effective transmission time of the PUCCH resource, and the second timer is used to control a maximum transmission time for transmitting the PUCCH resource; the current effective transmission time of the PUCCH resource does not overlap with a transmission resource carrying HARQ information, and the transmission resource corresponds to a time domain resource used for transmission; the current effective transmission time of the PUCCH resource does not overlap with a transmission resource corresponding to the scheduling request, and the transmission resource corresponds to the time domain resource used for transmission; before the current effective transmission time of the PUCCH resource, DCI for scheduling the PUSCH resource is not transmitted to the terminal device by the network device; DCI for scheduling the PUSCH resource is not transmitted to the terminal device in a third time period or a fourth time period, an end time of the third time period is earlier than the current effective transmission time or is a time within the current effective transmission time, and a start time of the fourth time period is later than the current effective transmission time or is a time within the current effective transmission time; and before the current effective transmission time of the PUCCH resource, the MAC CE transmitted by the terminal device through the PUSCH resource is not received by the network device.

Optionally, in some embodiments, the PUSCH resource includes the fourth PUSCH resource, and the fourth PUSCH resource is a resource indicated by a response message for the reporting message.

Optionally, in some embodiments, the PUSCH resource includes a first PUSCH resource, and the first PUSCH resource overlaps with a current effective transmission time of the PUCCH resource; and/or the PUSCH resource includes a second PUSCH resource, the second PUSCH resource is located in a first time period or a second time period in a time domain, an end time of the first time period is earlier than the current effective transmission time or is a time within the current effective transmission time, and a start time of the second time period is later than the current effective transmission time or is a time within the current effective transmission time; and/or the PUSCH resource includes a third PUSCH resource, DCI for scheduling the third PUSCH resource is located in a third time period or a fourth time period in the time domain, an end time of the third time period is earlier than the current effective transmission time or is a time within the current effective transmission time, and a start time of the fourth time period is later than the current effective transmission time or is a time within the current effective transmission time; and/or the PUSCH resource includes a fifth PUSCH resource, and the fifth PUSCH resource is scheduled by configured grant type 1 or configured grant type 2.

Optionally, in some embodiments, the end time of the first time period or the third time period is a start point of a first symbol of the PUCCH resource.

Optionally, in some embodiments, a value of a duration of the first time period or the third time period is determined according to at least one of the following situations: a protocol stipulation, a pre-configuration of the network device and a reporting capability of the terminal device.

Optionally, in some embodiments, the start time of the second time period or the fourth time period is an end point of a last symbol or the start point of the first symbol of the PUCCH resource.

Optionally, in some embodiments, a value of a duration of the second time period or the fourth time period is determined according to at least one of the following situations: the protocol stipulation, the pre-configuration of the network device and the reporting capability of the terminal device.

Optionally, in some embodiments, the configuration information includes a mandatory field to indicate the PUCCH resource.

Optionally, in some embodiments, the MAC CE carries beam failure information of the secondary cell.

Optionally, in some embodiments, the configuration information indicates at least one of the following information: a period of transmitting the reporting message through the PUCCH resource, a time domain offset of each period of the PUCCH resource, a maximum transmission number of transmitting the reporting message through the PUCCH resource, a timer for a maximum transmission time of transmitting the reporting message through the PUCCH resource, a window time of the maximum transmission time of transmitting the reporting message through the PUCCH resource, a timer for an interval of transmitting the reporting message through the PUCCH resource, a cell corresponding to the PUCCH resource, a bandwidth part (BWP) corresponding to the PUCCH resource, and a PUCCH format corresponding to the PUCCH resource.

Optionally, in some embodiments, the cell corresponding to the PUCCH resource is a primary cell, a primary secondary cell or a secondary cell supporting PUCCH transmission of the terminal device.

Optionally, in some embodiments, the PUCCH format corresponding to the PUCCH resource is PUCCH format 0 or PUCCH format 1.

Optionally, in some embodiments, if the PUCCH format corresponding to the PUCCH resource is PUCCH format 0, a parameter in a cyclic factor of the PUCCH resource is a specific value.

Optionally, in some embodiments, the specific value is stipulated by a protocol or configured by the network device.

Optionally, in some embodiments, if the PUCCH format corresponding to the PUCCH resource is PUCCH format 1, a bit value of the reporting message transmitted on the PUCCH resource is a specific value.

Optionally, in some embodiments, the specific value is stipulated by a protocol or configured by the network device.

The embodiments of the present disclosure also provide a communication device 900. The communication device 900 shown in FIG. 9 includes a processor 910 and a memory 920. The memory 920 is configured to store a computer program, and the processor 910 is configured to invoke and run the computer program stored in the memory, to implement the method in the embodiments of the present disclosure.

The processor 910 can invoke the computer program from the memory and run the computer program, to implement the method in the embodiments of the present disclosure.

The memory 920 may be a component independent of the processor 910, or may be integrated into the processor 910.

Figure 9:
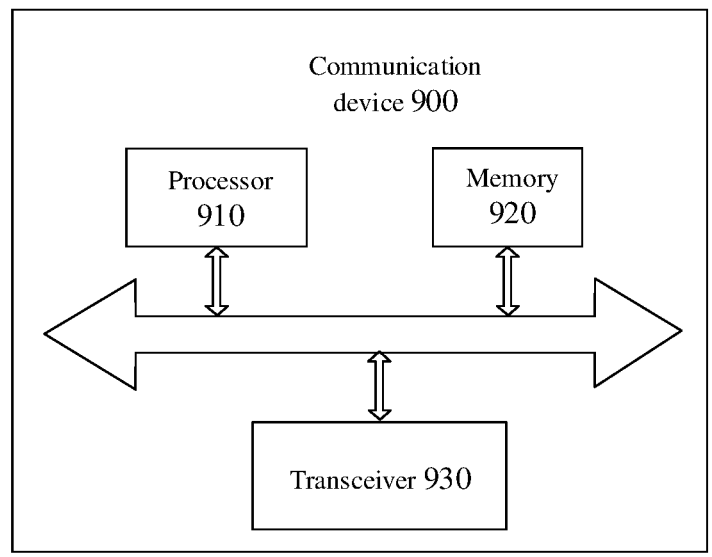
FIG. 9 is a schematic block diagram of a communication device provided by an embodiment of the present disclosure.

Optionally, as shown in FIG. 9, the communication device 900 may further include a transceiver 930. The processor 910 may control the transceiver 930 to communicate with another device, and specifically, the transceiver 930 may transmit information or data to another device, or receive information or data transmitted by another device.

The transceiver 930 may include a transmitter and a receiver. The transceiver 930 may further include an antenna. There may be one or more antennas.

Optionally, the communication device 900 may be the network device in the embodiments of the present disclosure, and the communication device 900 can implement corresponding procedures implemented by the network device in various methods in the embodiments of the present disclosure. For brevity, details are not described herein again.

Optionally, the communication device 900 may be the mobile terminal/terminal in the embodiments of the present disclosure, and the communication device 900 can implement corresponding procedures implemented by the terminal device in various methods in the embodiments of the present disclosure. For brevity, details are not described herein again.

Figure 10:
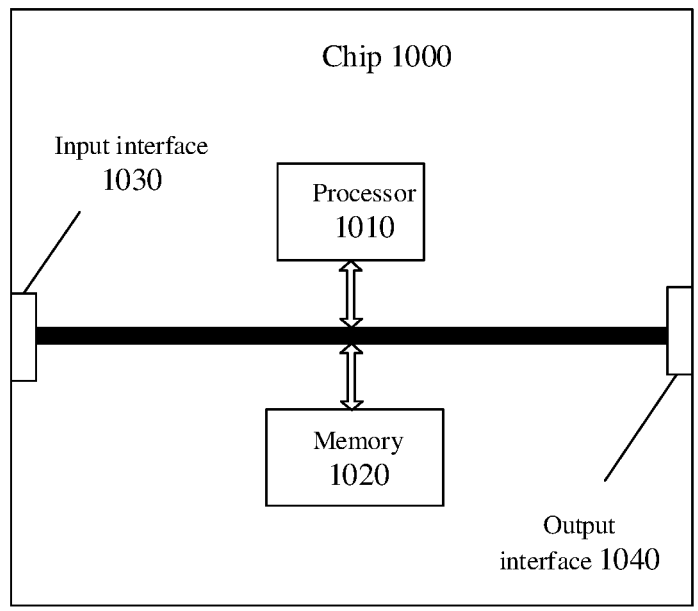
FIG. 10 is a schematic block diagram of a chip provided by an embodiment of the present disclosure.

FIG. 10 is a schematic structural diagram of a chip according to an embodiment of the present disclosure. The chip 1000 shown in FIG. 10 includes a processor 1010. The processor 1010 may invoke a computer program from a memory and run the computer program, to implement the method in the embodiments of the present disclosure.

Optionally, as shown in FIG. 10, the chip 1000 may further include a memory 1020. The processor 1010 may invoke the computer program from the memory 1020 and run the computer program, to implement the method in the embodiments of the present disclosure.

The memory 1020 may be a component independent of the processor 1010, or may be integrated into the processor 1010.

Optionally, the chip 1000 may further include an input interface 1030. The processor 1010 may control the input interface 1030 to communicate with another device or chip, and specifically, the input interface 1030 may obtain information or data transmitted by another device or chip.

Optionally, the chip 1000 may further include an output interface 1040. The processor 1010 may control the output interface 1040 to communicate with another device or chip, and specifically, the output interface 1040 may output information or data to another device or chip Optionally, the chip may be applied in the network device according to embodiments of the present disclosure, and the chip can implement corresponding procedures implemented by the network device in various methods in the embodiments of the present disclosure. For brevity, details are not described herein again.

Optionally, the chip may be applied to the mobile terminal/terminal device in the embodiments of the present disclosure, and the chip can implement corresponding procedures implemented by the mobile terminal/terminal device in various methods in the embodiments of the present disclosure. For brevity, details are not described herein again.

It should be noted that, the chip mentioned in the embodiments of the present disclosure may also be referred to as a system-level chip, a system chip, a chip system, a system on chip, or the like.

It should be understood that, the processor of the embodiments of the present disclosure may be an integrated circuit chip, has a signal processing capability, the steps of the foregoing method embodiment may be implemented by using a hardware integrated logic circuit in the processor and/or implemented by using an instruction in a software form. The foregoing processor may be a general purpose processor, a digital signal processor (DSP), a field programmable gate array (FPGA), an application specific integrated circuit (ASIC) or another programmable logic device, a transistor logic device, or a discrete hardware component. The foregoing general purpose processor may be a microprocessor, or may be any conventional processor, or the like. Steps of the methods disclosed with reference to the embodiments of the present invention may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory, and the processor reads information in the memory and completes the steps in the foregoing method embodiments in combination with hardware of the processor.

It should be understood that, the memory in the embodiments of the present disclosure may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM), and is used as an external cache. By way of examples but of no limitation, many forms of RAM are available, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synclink dynamic random access memory (SLDRAM), and a direct rambus random access memory (DRRAM). It should be noted that, the memory of the system and the method described in this embodiment of the present disclosure is intended to include but is not limited to these memories and any other suitable type of memory.

It should be understood that, the memory is an example but is not intended for limitation. For example, the memory in the embodiments of the present disclosure may alternatively be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct rambus RAM (DR RAM), and the like. That is, the memory described in this embodiment of the present disclosure is intended to include but is not limited to these memories and any other suitable type of memory.

Figure 11:
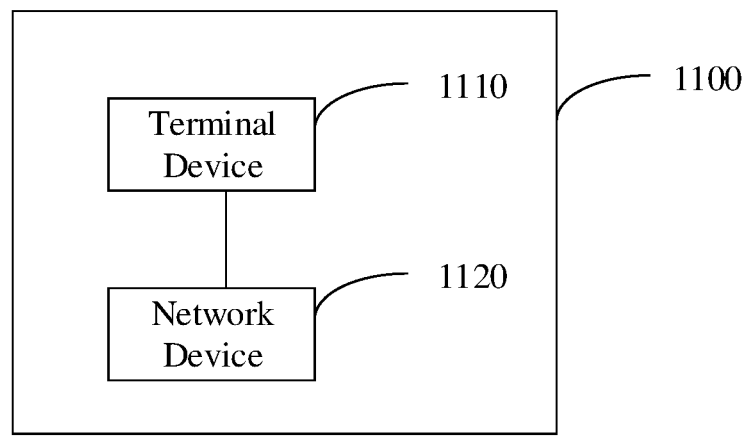
FIG. 11 is a schematic block diagram of a communication system provided by an embodiment of the present disclosure.

FIG. 11 is a schematic structural diagram of a communication system 1100 according to an embodiment of the present disclosure. The communication system 1100 shown in FIG. 11 includes a terminal device 1110 and a network device 1120.

The terminal device 1110 can implement corresponding functions implemented by the terminal device in the foregoing method and the network device 1120 can implement corresponding functions implemented by the network device in the foregoing method. For brevity, details are not described herein again.

An embodiment of the present disclosure further provides a computer readable storage medium. The computer readable storage medium is configured to store a computer program.

Optionally, the computer readable storage medium may be applied to the network device in the embodiments of the present disclosure, and the computer program enables a computer to execute a corresponding procedure implemented by the network device in the methods of the embodiments of the present disclosure. For brevity, details are not described herein again.

Optionally, the computer readable storage medium may be applied to the mobile terminal/terminal device in the embodiments of the present disclosure, and the computer program enables the computer to execute a corresponding procedure implemented by the mobile terminal/terminal device in the methods of the embodiments of the present disclosure. For brevity, details are not described herein again.

The present disclosure further provides a computer program product. The computer program product includes a computer program instruction.

Optionally, the computer program product may be applied to the network device in the embodiments of the present disclosure, and the computer program instruction enables the computer to execute a corresponding procedure implemented by the network device in the methods of the embodiments of the present disclosure. For brevity, details are not described herein again.

Optionally, the computer program product may be applied to the mobile terminal/terminal device in the embodiments of the present disclosure, and the computer program instruction enables the computer to execute a corresponding procedure implemented by the mobile terminal/terminal device in the methods of the embodiments of the present disclosure. For brevity, details are not described herein again.

The present disclosure further provides a computer program.

Optionally, the computer program may be applied to the network device in the embodiments of the present disclosure, and when run on a computer, the computer program instruction enables the computer to execute a corresponding procedure implemented by the network device in the methods of the embodiments of the present disclosure. For brevity, details are not described herein again.

Optionally, the computer program may be applied to the mobile terminal/terminal device in the embodiments of the present disclosure, and when run on a computer, the computer program instruction enables the computer to execute a corresponding procedure implemented by the mobile terminal/terminal device in the methods of the embodiments of the present disclosure. For brevity, details are not described herein again.

A person of ordinary skill in the art may be aware that, in combination with the examples described in the embodiments disclosed in this specification, units and algorithm steps may be implemented by using electronic hardware or a combination of computer software and electronic hardware. Whether these functions are executed by means of hardware or software depends on specific applications and design constraints of the technical solutions. A person skilled in the art may use different methods to implement the described functions for each particular application, but it should not be considered that the implementation goes beyond the scope of the present disclosure.

A person skilled in the art may clearly understand that, for simple and clear description, for specific work processes of the foregoing described system, apparatus, and unit, reference may be made to corresponding process in the foregoing method embodiments, and details are not described herein again.

In the several embodiments provided in the present disclosure, it should be understood that the disclosed system, apparatus, and method may be implemented in other manners. For example, the apparatus embodiments described above are merely examples. For example, the unit division is merely logical function division, and there may be other division manners in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and the parts displayed as units may or may not be physical units, may be located in one position, or may be distributed on multiple network units. Some of or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

Described above are merely specific implementations of the present disclosure, but the protection scope of the present disclosure is not limited thereto. Changes or replacements readily figured out by any person skilled in the art within the technical scope disclosed in the present disclosure shall be covered by the protection scope of the present disclosure. Therefore, the protection scope of the present disclosure shall be subject to the protection scope of the claims.

What is claimed is:

1. A method for wireless communication, comprising:
   receiving, by a terminal device, a configuration indicated by a network device;
   in response to a beam failure occurred in a secondary cell, generating, by the terminal device, a scheduling request, the scheduling request being used to request an uplink transmission resource from the network device;
   receiving, by the terminal device, a response message for the scheduling request sent by the network device, the response message indicating a first resource; and
   transmitting, by the terminal device, beam failure information of the secondary cell through a medium access control, MAC, control element, CE, the beam failure information being carried on the first resource,
   wherein in response to the configuration indicated by the network device being a first configuration, the scheduling request corresponds to the first configuration, and the first configuration is a configuration of a scheduling request associated with at least one logical channel,
   wherein in response to the configuration indicated by the network device being a second configuration, the scheduling request corresponds to the second configuration, the second configuration is a configuration of a scheduling request not associated with a logical channel, and a scheduling request identifier of the second configuration is different from a scheduling request identifier corresponding to a configuration of a scheduling request associated with a logical channel.

2. The method according to claim 1, wherein in response to the configuration being the first configuration, the first configuration is determined from a configuration set based on at least one of the following:
indication information of the network device, a scheduling request identifier corresponding to each configuration in the configuration set, a resource identifier corresponding to each configuration in the configuration set, and a priority order of logical channels corresponding to respective configurations in the configuration set; or
the first configuration is randomly selected from the configuration set,
wherein, the configuration set comprises a configuration of at least one scheduling request, and each scheduling request corresponds to the at least one logical channel.

3. The method according to claim 1, wherein:
a priority of transmitting beam failure information of the secondary cell is higher than a priority of transmitting any logical channel; or
the priority of transmitting the beam failure information of the secondary cell is higher than a priority of transmitting cell-radio network temporary identifier (C-RNTI) information or data from an uplink common control channel (UL-CCCH); or
the priority of transmitting the beam failure information of the secondary cell is lower than the priority of transmitting the C-RNTI information or the data from the UL-CCCH, and higher than a priority of transmitting configured grant confirmation information; or
the priority of transmitting the beam failure information of the secondary cell is the same as the priority of transmitting the C-RNTI information or the data from the UL-CCCH; or
the priority of transmitting the beam failure information of the secondary cell is the same as the priority of transmitting the configured grant confirmation information; or
the priority of transmitting the beam failure information of the secondary cell is lower than the priority of transmitting the configured grant confirmation information and higher than a priority of transmitting buffer status report (BSR) information; or
the priority of transmitting the beam failure information of the secondary cell is the same as the priority of transmitting the BSR information; or
the priority of transmitting the beam failure information of the secondary cell is lower than the priority of transmitting the BSR information and higher than a priority of transmitting a single piece of power headroom report (PHR) information or multiple pieces of PHR information.

4. The method according to claim 1, further comprising:
transmitting, by the terminal device, the beam failure information of the secondary cell to the network device; and
confirming, by the terminal device, that Beam Failure Recovery (BFR) of the secondary cell is successful in response to the response message for the beam failure information of the secondary cell being received.

5. A terminal device, comprising a processor and a memory, wherein the memory is configured to store a computer program, and the processor is configured to call and run the computer program stored in the memory, to;

receive a configuration indicated by a network device;
generate a scheduling request in response to a beam failure occurred in a secondary cell, the scheduling request being used to request an uplink transmission resource from the network device;
receive a response message for the scheduling request sent by the network device, the response message indicating a first resource; and
transmit beam failure information of the secondary cell through a medium access control, MAC, control element, CE, the beam failure information being carried on the first resource,
wherein in response to the configuration indicated by the network device being a first configuration, the scheduling request corresponds to the first configuration, and the first configuration is a configuration of a scheduling request associated with at least one logical channel,
wherein in response to the configuration indicated by the network device being a second configuration, the scheduling request corresponds to the second configuration, the second configuration is a configuration of a scheduling request not associated with a logical channel, and a scheduling request identifier of the second configuration is different from a scheduling request identifier corresponding to a configuration of a scheduling request associated with a logical channel.

6. The terminal device according to claim 5, wherein in response to the configuration being the first configuration, the first configuration is determined from a configuration set based on at least one of the following:
indication information of the network device, a scheduling request identifier corresponding to each configuration in the configuration set, a resource identifier corresponding to each configuration in the configuration set, and a priority order of logical channels corresponding to respective configurations in the configuration set; or
the first configuration is randomly selected from the configuration set,
wherein, the configuration set comprises a configuration of at least one scheduling request, and each scheduling request corresponds to at least one logical channel.

7. The terminal device according to claim 5, wherein:
a priority of transmitting beam failure information of the secondary cell is higher than a priority of transmitting any logical channel; or
the priority of transmitting the beam failure information of the secondary cell is higher than a priority of transmitting cell-radio network temporary identifier (C-RNTI) information or data from an uplink common control channel (UL-CCCH); or
the priority of transmitting the beam failure information of the secondary cell is lower than the priority of transmitting the C-RNTI information or the data from the UL-CCCH, and higher than a priority of transmitting configured grant confirmation information; or
the priority of transmitting the beam failure information of the secondary cell is the same as the priority of transmitting the C-RNTI information or the data from the UL-CCCH; or
the priority of transmitting the beam failure information of the secondary cell is the same as the priority of transmitting the configured grant confirmation information; or
the priority of transmitting the beam failure information of the secondary cell is lower than the priority of transmitting the configured grant confirmation information and higher than a priority of transmitting buffer status report (BSR) information; or the priority of transmitting the beam failure information of the secondary cell is the same as the priority of transmitting the BSR information; or the priority of transmitting the beam failure information of the secondary cell is lower than the priority of transmitting the BSR information and higher than a priority of transmitting a single piece of power headroom report (PHR) information or multiple pieces of PHR information.

8. The terminal device according to claim 5, wherein the processor is further configured to:

transmit the beam failure information of the secondary cell to the network device; and confirm that Beam Failure Recovery (BFR) of the secondary cell is successful in response to the response message for the beam failure information of the secondary cell being received.

9. A network device, comprising a processor and a memory, wherein the memory is configured to store a computer program, and the processor is configured to call and run the computer program stored in the memory, to:

transmit a configuration to a terminal device;

receive a scheduling request transmitted from the terminal device in response to a beam failure occurred in a secondary cell, the scheduling request being used to request an uplink transmission resource from the network device;

transmit a response message for the scheduling request to the terminal device, the response message indicating a first resource; and receive beam failure information of the secondary cell through a medium access control (MAC) control element (CE), the beam failure information being carried on the first resource, wherein in response to the configuration sent by the network device being a first configuration, the scheduling request corresponds to the first configuration, and the first configuration is a configuration of a scheduling request associated with at least one logical channel, and wherein in response to the configuration sent by the network device being a second configuration, the scheduling request corresponds to the second configuration, the second configuration is a configuration of a scheduling request not associated with a logical channel, and a scheduling request identifier of the second configuration is different from a scheduling request identifier corresponding to a configuration of a scheduling request associated with a logical channel.

* * * * *